US008773242B2

(12) United States Patent
Park et al.

(10) Patent No.: US 8,773,242 B2
(45) Date of Patent: Jul. 8, 2014

(54) RFID INTERROGATOR CALCULATING ADAPTIVE RETRANSMISSION WAIT TIME AND CONTROL METHOD THEREOF

(75) Inventors: Chanwon Park, Daejeon (KR); Sewon Oh, Daejeon (KR); Gilyoung Choi, Daejeon (KR); Cheolsig Pyo, Daejeon (KR); Jongsuk Chae, Daejeon (KR); David Tschische, Klangenfurt (AT)

(73) Assignees: Electronics and Telecommunications Research Institute, Daejeon (KR); Cisc Semiconductor Design+Consulting GmbH, Klagenfurt (AT)

( * ) Notice: Subject to any disclaimer, the term of this patent is extended or adjusted under 35 U.S.C. 154(b) by 955 days.

(21) Appl. No.: 12/922,054

(22) PCT Filed: Mar. 12, 2009

(86) PCT No.: PCT/KR2009/001254
  § 371 (c)(1),
  (2), (4) Date: Sep. 15, 2010

(87) PCT Pub. No.: WO2009/113826
  PCT Pub. Date: Sep. 17, 2009

(65) Prior Publication Data
  US 2011/0006884 A1    Jan. 13, 2011

Related U.S. Application Data

(60) Provisional application No. 61/035,805, filed on Mar. 12, 2008.

(51) Int. Cl.
  *H04Q 5/22*    (2006.01)
  *G06K 7/10*    (2006.01)
(52) U.S. Cl.
  CPC ................... *G06K 7/10019* (2013.01)
  USPC ........................................................ 340/10.2
(58) Field of Classification Search
  USPC ......................................... 340/1.1, 10.1, 10.2
  See application file for complete search history.

(56) References Cited

U.S. PATENT DOCUMENTS

| 5,365,551 | A | 11/1994 | Snodgrass et al. |
| 6,813,260 | B1 * | 11/2004 | Fogle ............................ 370/338 |
| 2006/0170534 | A1 * | 8/2006 | Arneson et al. ............... 340/10.2 |
| 2007/0205869 | A1 | 9/2007 | Tanaka |

FOREIGN PATENT DOCUMENTS

| JP | 2007-241392 | 9/2007 |
| KR | 10-0858053 | 9/2008 |
| WO | 2007/081119 A1 | 7/2007 |

OTHER PUBLICATIONS

Shih, Dong-Her et al., "Taxonomy and survey of RFID anti-collision protocols," Computer Communications, vol. 29:2150-2166 (2006).

* cited by examiner

Primary Examiner — Brian Zimmerman
Assistant Examiner — Sara Samson
(74) Attorney, Agent, or Firm — Nelson Mullins Riley & Scarborough LLP; Anthony A. Laurentano, Esq.; Dipti Ramnarain, Esq.

(57) ABSTRACT

As an RFID interrogator calculating an adaptive retransmission wait time and a control method thereof, the RFID interrogator includes a collision diagnosis unit that analyzes data on a received signal received during a receive time in correspondence with a transmitted signal from an RF communication unit that can transmit and receive signal to and from one or more tag, verifies whether or not a collision occurs in the received signal, and diagnoses a collision type depending on an analysis result of the data on the received signal; a situational command retransmission portion that determines whether or not the command is retransmitted on the basis of the occurrence of the collision and the collision type received from the collision diagnosis unit; and a random wait time calculation portion that calculates a random wait time for retransmitting the command.

20 Claims, 18 Drawing Sheets bit time($T_{pri}$)= M/BLF

Figure 11
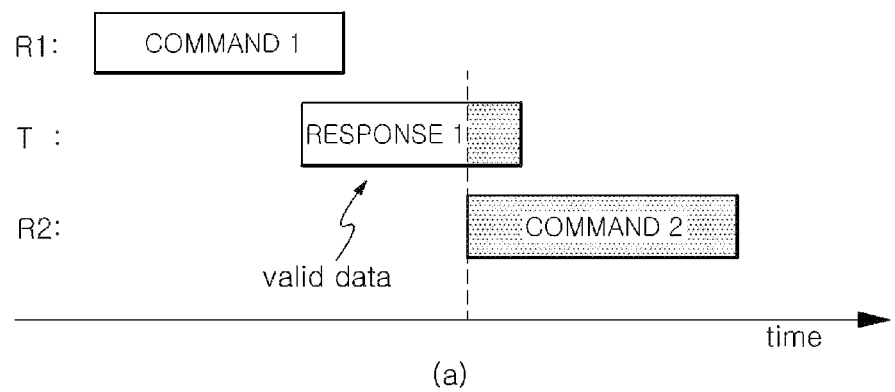
(a)
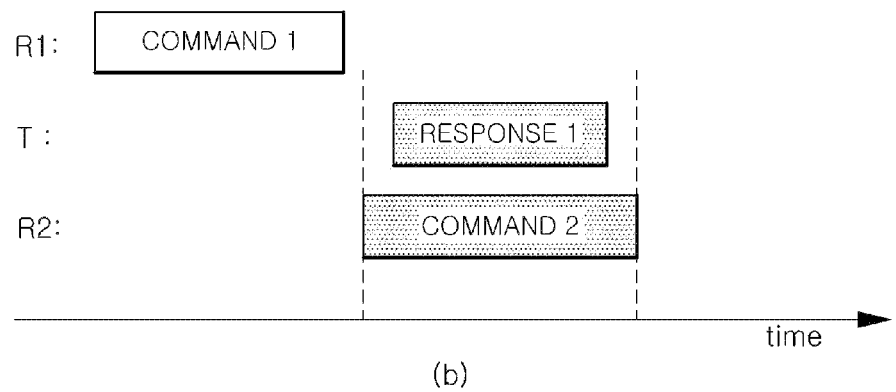
(b)

Figure 16

```
...
while(1){
 transmit(command);
 receiveResponse(); //this procedure asserts or deasserts a series of status
 flags
 retrAttempts = 0;
 maxRetrAttempts = X;
 while(validTagResponsePending == true){
    if(collisionDetected){
         switch(typeOfCollision){
             case ToT:   //Tag on Tag Collision
                 retransmit = false;
                 applayWaitTime = false;
                 break;
             case MtoT:   //Multiple Interrogators on Tag Collision
             case ItoI:   //interrogator to Interrogator Collision
                 if(retrAttempts < maxRetrAttempts){
                     retransmit = true;
                     retrAttempts = retrAttempts+1;
                     if(internalState <= Reply && tagsDetected = 0){
                         applyWaitTime = true;
                     }
                 }
                 break;
         }
    }else if(receiverTimeout){
        if(internalState <= Reply && tagsDetected = 0{
          retransmit = false;
          applyWaitTime = false;
        }else{
          if(retrAttempts == 0){
                 retransmit = true;
                 retrAttempts = retrAttempts+1;
          }else{
                 retransmit = false;
          }
          applyWaitTime = false;
        }
    } if(applyWaitTime == true){
        waitTime = getRandomWaitTime();
        wait(waitTime);
    } if(retransmit == true){
        retransmit(last_command);
    }else{
        anticollision();
    }
 }
}
...
```

Figure 21

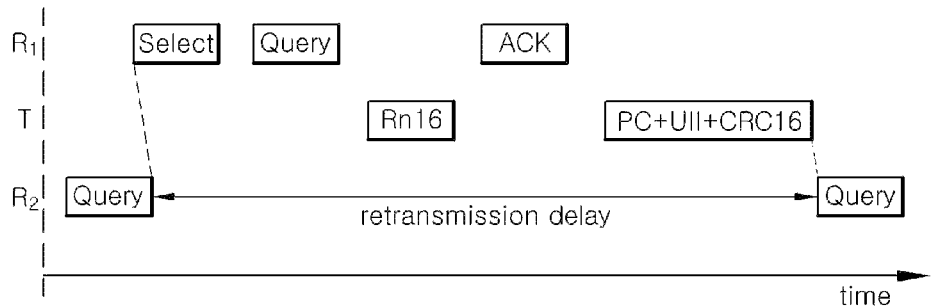

Figure 22

| Subject | Value | Unit | Comment |
|---|---|---|---|
| data0 | 25.0 | μs | Tari |
| data1 | 37.5 | μs | 1.5*Tari |
| RTcal | 62.5 | μs | data0+data1 |
| TRcal | 200.0 | μs | BLF=DR/TRCal |
| DR | 8.0 | 1 | DR=false |
| Tpri | 25.0 | μs | trCal/DR |
| T1 | 250.0 | μs | MAX(RTcal, 10*Tpri) |
| T2 | 75.0 | μs | 3*Tpri |
| T3 | 0.0 | μs | 0*Tpri |
| T4 | 125.0 | μs | 2xRTcal |
| PIE delimiter | 12.5 | μs | fixed duration |
| PIE preamble | 300.0 | μs | delimiter+data0+RTCal+TRCal |
| PIE frame synch | 100.0 | μs | delimiter+data0+RTCal |
| FM0 preamble | 150.0 | μs | 6*Tpri |
| Select | 1375.0 | μs | 45-bit Select(empty Mask field) |
| Query | 962.5 | μs | incl. preamble |
| ACK | 662.5 | μs | incl. frame synch |
| RN16 | 550.0 | μs | incl. preamble |
| UII | 3350.0 | μs | incl. preamble;PC+UII+CRC16; 96-bit UII assumed |

RFID INTERROGATOR CALCULATING ADAPTIVE RETRANSMISSION WAIT TIME AND CONTROL METHOD THEREOF

RELATED APPLICATIONS

This application is a 35 U.S.C. §371 national stage filing of PCT Application No. PCT/KR2009/001254 filed on Mar. 12, 2009, which claims priority to, and the benefit of, U.S. Provisional Application No. 61/035,805 filed on Mar. 12, 2008. The contents of the aforementioned applications are hereby incorporated by reference.

TECHNICAL FIELD

The present invention relates to a mobile RFID interrogator and a control method thereof, and more particularly, to an RFID interrogator that can perform command retransmission depending on a collision type and adaptively set a wait time for the command retransmission and a control method thereof.

BACKGROUND ART

An RFID radio interface specification (i.e., ISO/IEC 18000-6) is developed to include an RFID architecture (i.e., RFID portals), to remarkably reduce a communication error generated due to an inter-tag interference, etc. while easily detecting and controlling the communication error.

However, recently, as a handheld-based RFID interrogator occupies a great part, a necessity for a technique to secure effective use of an RFID technology in a mobile application is on the rise. In particular, compared with most of static scenarios, a position and local arrangement of an active mobile device, for example, a distance from a target and a direction of an antenna cannot be fundamentally predicted. That is, it is actually difficult to determine the number of RFID interrogators that are asynchronously operated compared with tag detection in the same frequency channel.

Currently, RFID interrogators close to each other are connected to each other by wires to be synchronized, but such hard-wired synchronization cannot be adopted in the mobile application. Of course, theoretically, the synchronization may be adopted in a radio communication environment. However, up to now, since the position of the RFID interrogator cannot be found, an additional channel is required to synchronize an RFID handheld device.

Listen before talk (LBT) which is mandatorily used in Europe is used as another mechanism for preventing a plurality of RFID interrogators from being activated at the same time. However, the LBT is not effective in a mobile RFID. The reason for this is that since the arrangement of the RFID interrogator considerably varies, a threshold of available reception sensitivity cannot be determined.

In addition, a method for overcoming unintentional collision of the adjacent RFID interrogators includes time division multiplexing (TDM), frequency division multiplexing (FDM), etc. However, when temporal synchronization is not supported or only one channel is assigned to the mobile RFID, the mechanisms cannot be adopted in the mobile RFID. In other words, the RFID interrogator cannot be discriminated from tag communication with clarity and in the spectrum.

In order to effectively use the RFID interrogator in the mobile environment, the RFID interrogator must adapt to the communication error, which is currently on the rise in the mobile environment. However, currently, a general RFID radio interface specification such as ISO/IEC 18000-6 Type C has no restriction with respect to the number of command timings that the interrogator can retransmit or a condition for retransmitting the commands in the case in which a failure occurs during an inventory round. Further, a method for finding a reasonable compromise point between collision avoidance and processing performance is required with respect to a reference range for selecting a random wait time for retransmitting the commands.

Another objects and advantages of the present invention can be appreciated by the following description and will be clearly described by the embodiments of the present invention. Further, it will be easily known that the objects and advantages of the present invention can be implemented by means and a combination thereof shown in the appended claims.

DISCLOSURE

Technical Problem

The present invention is contrived to solve the problems of the related art. In particular, an object of the present invention is to provide an RFID interrogator and a control method thereof that can perform retransmission of commands depending on various collision types and situations and adaptively set an optimum wait time for retransmitting the commands in a mobile RFID environment.

Technical Solution

In order to achieve the above-mentioned object, an RFID interrogator calculating an adaptive retransmission wait time includes a collision diagnosis unit that analyzes data on a received signal received during a receive time in correspondence with a transmitted signal from an RF communication unit that can transmit and receive signal to and from one or more tag, verifies whether or not a collision occurs in the received signal, and diagnoses a collision type depending on an analysis result of the data on the received signal; a situational command retransmission portion that determines whether or not the command is retransmitted on the basis of the occurrence of the collision and the collision type received from the collision diagnosis unit; and a random wait time calculation portion that calculates a random wait time for retransmitting the command, wherein the random wait time calculation portion randomly selects the random wait time between a minimum retransmission wait time and a maximum retransmission wait time determined in correspondence with a value acquired by multiplying a wait time parameter by an upper threshold and a lower threshold of a retransmission wait threshold value and the wait time parameter can be dynamically changed.

Further, a control method of an RFID interrogator calculating an adaptive retransmission wait time according to the present invention includes a collision diagnosis step of allowing a collision diagnosis unit to analyze data on a received signal received during a receive time in correspondence with a transmitted signal from an RF communication unit, verify whether or not a collision occurs in the received signal, and diagnose a collision type depending on an analysis result of the data on the received signal; a command retransmission determination step of allowing a situational command retransmission portion to determine whether or not the command is retransmitted on the basis of the occurrence of the collision and the collision type; and a random wait time calculating step of allowing a random wait time calculation portion to calculate a random wait time for retransmitting a command, wherein at the step of calculating the random wait time, the random wait time is randomly selected between a minimum retransmission wait time and a maximum retransmission wait time determined in correspondence with a value acquired by multiplying a wait time parameter by an upper threshold and a lower threshold of a retransmission wait threshold value and the wait time parameter can be dynamically changed.

Advantageous Effects

According to the present invention, since an RFID interrogator can identify all types of collisions that occur while reading a tag, the RFID interrogator has an advantage of quickly recognizing a reason for occurrence of the collisions. Accordingly, it is possible to cope with the reason for the occurrence of the collisions. Further, in the case in which the collisions is detected in a mobile application equipped with the RFID interrogator, it is possible to successively terminate an already started inventory round by processing collision control depending on a situation corresponding to a type of corresponding collision. It is possible to perform retransmission of commands depending on the situation in accordance with the type of collision and adaptively set a wait time for retransmission of the commands.

DESCRIPTION OF DRAWINGS

FIGS. 5 to 11 are exemplary diagrams referenced for describing the operation of an RFID interrogator according to the present invention;

FIG. 16 illustrates a pseudo code of a collision resolution algorithm described by referring to FIG. 15;

FIG. 21 is a timing diagram for illustrating a meaning of a maximum retransmission wait time according to an embodiment of the present invention;

FIG. 22 is a timing table in an ISO/IEC 18000-6 Type C environment;

BEST MODE

Hereinafter, preferred embodiments of the present invention will be described with reference to the accompanying drawings in order to help understand the present invention. The embodiments to be described are provided to more easily understand the present invention. The present invention is not limited to the embodiments.

In a mobile RFID interrogator service in which information on products or works attached with tags are inquired or purchased by means of a mobile phone mounted with an RFID interrogator (RFID reader) operating in an RFID environment, for example, within an ultrahigh frequency (UHF) band, the present invention provides an apparatus and a method that can identify a reason for an occurring collision by analyzing a reception signal having an error so as to solve the occurring error, retransmit a command depending on a collision situation, and properly set a wait time for retransmission in the case in which the error occurs in the received signal due to a collision between the corresponding RFID interrogator and RFID interrogators or tags adjacent thereto.

The present invention relates to an air interface specification of mobile radio frequency identification (RFID). A system according to the present invention, as an ITF (interrogator talks first) system operating in a passive backscatter scheme, includes one or more mobile RFID reader and a plurality of tags. Hereinafter, the RFID reader is described as the RFID interrogator and the two terms have the same meaning as long as they are not differently described or not definitively analyzed.

The RFID interrogator according to the present invention may be not required to support channel sensing. For example, the RFID interrogator does not need to implement Listen Before Talk (LBT) and transmits commands under the risk of colliding with one or more interrogators. Further, the interrogators are not obligated to synchronize by means of a control channel for Time Division Multiplexing (TDM), etc.

Tags are powered by an RF signal provided by the interrogator and respond to an interrogator's command by modulating the reflection coefficient of an antenna, thereby backscattering data to the interrogator. It is assumed that the working mode of the tags is passive and the tags do not actively initiate any kind of RF communication. The present invention relates to collision arbitration and collision avoidance for mobile RFID applications, and more particularly, to mechanisms that aim at mitigating the impact of collisions and are used to avoid follow-up collisions.

Parts that are not specifically covered in the present invention will be sufficiently appreciated in accordance with a radio interface specification published by ISO/IEC 18000-6 Type C and may adopt other radio interface specifications for reference as necessary.

Hereinafter, embodiments of the present invention will be described with reference to the accompanying drawings.

Figure 1:
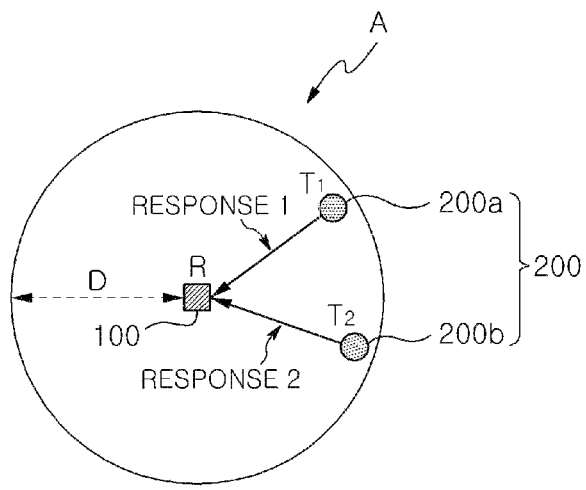
FIGS. 1 to 3 are exemplary diagrams illustrating a collision type situation according to the present invention.
Figure 2:
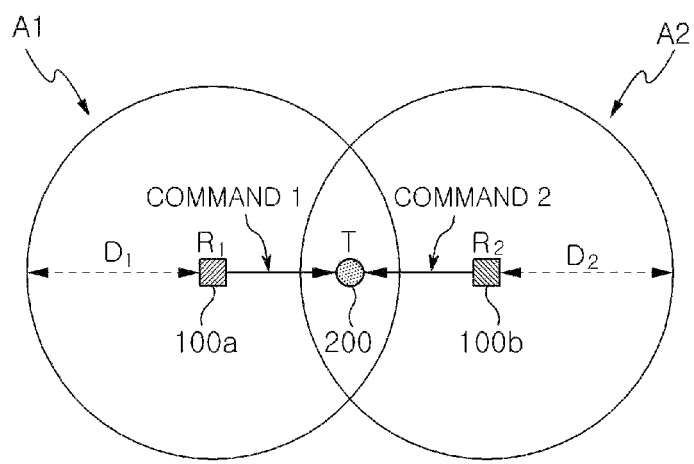
Figure 3:
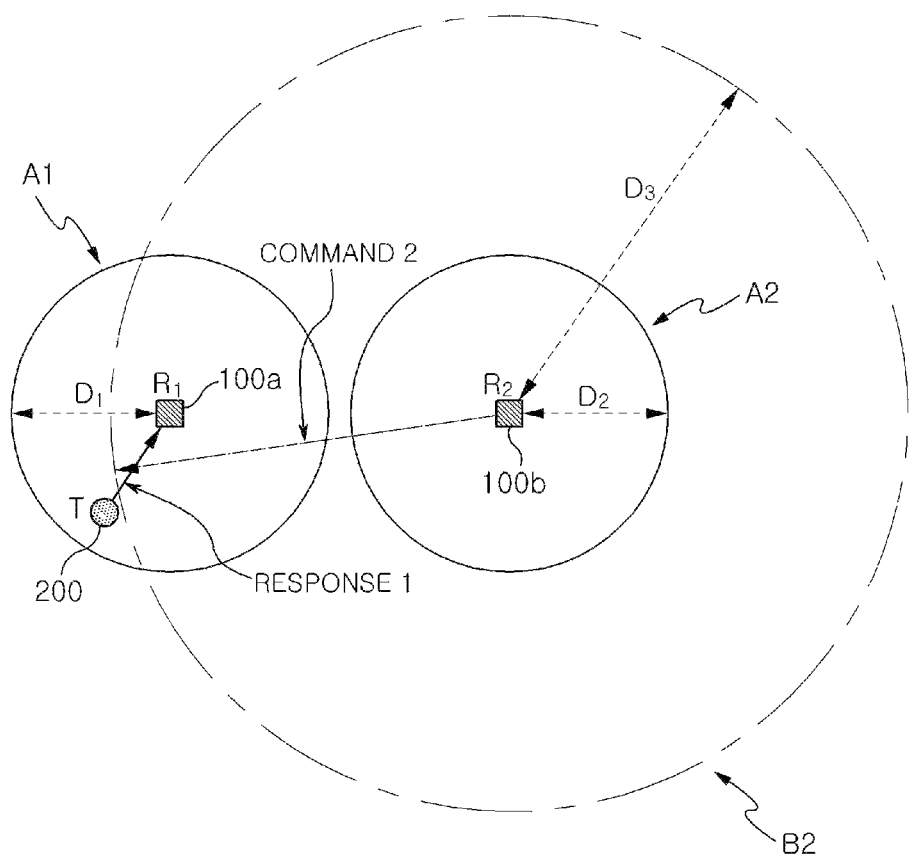

FIGS. 1 to 3 illustrate collision situation of networks according to an embodiment of the present invention.

The collision situation of the networks according to the present invention includes three types such as a 'tag on tag collision' that is caused between a plurality of tags, a 'multiple interrogators to tag collision' that is caused between a plurality of RFID interrogators and a tag, and an 'interrogator to interrogator collision' that is caused between the corresponding RFID interrogator and one or more RFID interrogator adjacent thereto.

First, FIG. 1 illustrates a tag on tag Collision situation according to an embodiment of the present invention.

Referring to FIG. 1, the 'Tag on Tag Collision' situation is caused when a plurality of tags 200 are provided in a read range A of one RFID interrogator R 100. In the embodiment of FIG. 1, two tags T1 200a and T2 200b are provided, but the present invention is not limited thereto and two or more tags may be provided.

First, when the R 100 outputs an inventory command, the T1 200a and T2 200b that are located in the A respond to the inventory command of the R 100. At this time, when the T1 200a and T2 200b respond to the inventory command at the same time, parallel responses of the T1 200a and the T2 200b interfere with each other. This is exactly the 'tag on tag collision'.

When the 'tag on tag collision' occurs, the R 100 has an error when decoding the tag response received from the T1 200a and the T2 200b due to the 'tag on tag collision'. Therefore, the R 100 that outputs the inventory command cannot exactly discriminate between the responses of the tags. The 'tag on tag collision' can be handled by an anti-collision algorithm described in the radio interface specification (e.g., ISO/IEC 18000-6 Type C). Hereinafter, if there is not provided another description, the tag anti-collision means a known algorithm that resolves the 'tag on tag collision'.

Hereinafter, the 'tag on tag collision' will be described as a first collision for ease of description.

Meanwhile, FIG. 2 illustrates a multiple interrogators to tag collision situation according to an embodiment of the present invention.

Referring to FIG. 2, a 'multiple interrogators to tag collision' situation is caused by a plurality of RFID interrogators. In the embodiment of FIG. 2, two RFID interrogators R1 100a and R2 100b are provided, but the present invention is not limited thereto and two or more RFID interrogators tags may be naturally provided.

That is, in a state when a read range A1 of the R1 100a and a read range A2 of the R2 100b partially overlap each other, a case in which one tag T 200 is positioned in a range where the A1 and the A2 partially overlap each other is described as one example.

At this time, when the R1 100a and the R2 100b output inventory commands to the T 200, the inventory commands outputted from the R1 100a and the R2 100b may collide with each other in the T 200. In this case, the T 200 has an error when decoding the inventory commands received from the R1 100a and the R2 100b.

Hereinafter, the 'multiple interrogators to tag collision' will be described as a 'second collision' for ease of description.

Meanwhile, FIG. 3 illustrates an 'interrogator to interrogator collision' situation according to an embodiment of the present invention.

Referring to FIG. 3, the 'interrogator to interrogator collision' includes two RFID interrogators R1 100a and R2 100b and occurs when an interference range B2 of the R2 100b overlaps the read range A1 of the R1 100a. In the embodiment of FIG. 3, the two RFID interrogators are provided, but the present invention is not limited thereto and two or more RFID interrogators may be naturally provided. Herein, the 'interrogator to interrogator collision' may occur even when the read ranges of the R1 100a and the R2 100b do not overlap each other.

For example, when the R1 100a outputs the inventory command to the tag T 200 positioned in the range A1, the T 200 transmits a response signal to the inventory command of R1 100a to the R1 100a. Therefore, the R1 100a performs an operation replying to the response signal received from the T 200. At this time, since the A1 and the B2 overlap each other, a predetermined command or other signals outputted from the R2 100b collide with the response signal of the T 200 inputted into the R1 100a. This is exactly the 'interrogator to interrogator collision'.

In related art, under a collision between the RFID interrogators, when an error is detected in the response signal received from the T 200, the R1 100a misrecognizes the collision as the 'tag on tag collision', such that the R1 100a intends to resolve the collision by adopting an anti-collision algorithm against the collision.

Further, since the 'interrogator to interrogator collision' may occur even when the read ranges of the two RFID interrogators do not overlap each other, a resolution scheme is not disclosed even in the radio interface specification. Therefore, a mechanism used to detect the Interrogator to Interrogator Collision is required in the mobile RFID applications. Therefore, in the embodiment of the present invention to be described below, an embodiment for detecting the 'interrogator to interrogator collision' is described.

Hereinafter, the 'interrogator to interrogator collision' will be described as a 'third collision' for ease of description.

Figure 4:
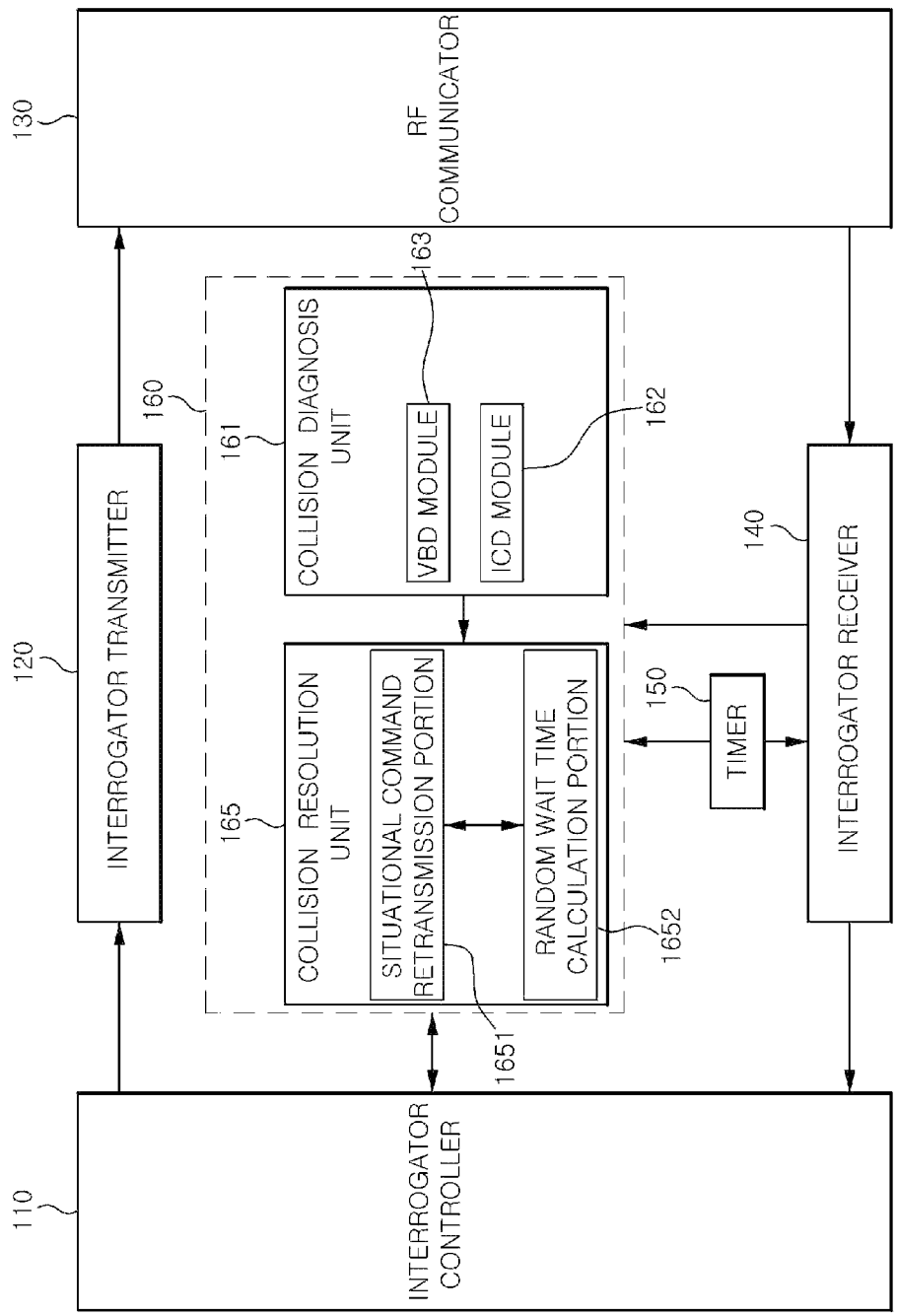
FIG. 4 is a block diagram illustrating the configuration of an RFID interrogator according to the present invention.

FIG. 4 is a diagram illustrating the configuration of an RFID interrogator according to an embodiment of the present invention.

Referring to FIG. 4, the RFID interrogator according to the present invention includes an interrogator controller 110, an interrogator transmitter 120, an RF communicator 130, an interrogator receiver 140, a collision controller 160, and a timer 150.

The interrogator controller 110 outputs an inventory command to at least one tag that is positioned within a predefined range and processes a tag response received in response to the inventory command.

The interrogator transmitter 120 (modem transmitter) transmits the inventory command of the interrogator controller 110 to the RF communicator 130. Herein, the interrogator transmitter 120 modulates the inventory command outputted from the interrogator controller 110 and transmits the inventory command to the RF communicator 130.

The RF communicator 130 receives the inventory command of the interrogator controller 110 from the interrogator transmitter 120 and transmits the inventory command to at least one tag that is positioned within a predefined range. Further, the RF communicator 130 transmits the inventory command to the outside and receives a signal from the outside during a set receive time. At this time, the RF communicator 130 receives a tag response from a tag within a read range in response to the inventory command which has already been transmitted during the set receive time. Of course, the RF communicator 130 may receive signals of other RFID interrogators or a noise without any signal in addition to the tag response. At this time, the RF communicator 130 transmits the received signal to the interrogator receiver 140.

The interrogator receiver 140 (modem receiver) transmits the received signal from the RF communicator 130 to the interrogator controller 110 and the collision controller 160. At this time, the interrogator receiver 140 transmits data of the received signal to the collision controller 160.

Meanwhile, the interrogator receiver 140 includes a decoder (not shown). At this time, the decoder decodes the received signal from the RF transmitter 130 and detects a valid preamble from the decoded received signal. The interrogator receiver 140 outputs a valid preamble detection (VPD) signal to the collision controller 160 depending on a valid preamble detection result of the decoder.

Further, the decoder detects a cyclic redundancy check (CRC) error from the decoded received signal. The interrogator receiver 140 outputs a CRC error detection signal to the collision controller 160 depending on a CRC error detection result of the decoder.

The collision controller 160 includes a collision diagnosis unit 161 and a collision resolution unit 165.

The collision diagnosis unit 161 checks whether or not a collision occurs with respect to the received signal by analyzing data of the received signal inputted from the interrogator receiver 140 and diagnoses a collision type depending on an analysis result of the data of the received signal.

Herein, the collision diagnosis unit 161 includes a valid bit detection (VBD) module 163 which is a valid bit detection module. The VBD module 163, as a sub-module of the collision diagnosis unit 161, detects a valid bit from the received signal inputted from the interrogator receiver 140. In other words, the VBD module 163 detects a valid logical signal by detecting a rising edge and a falling edge of the received signal, that is, modulated sub-carriers within a tolerance of a radio interface specification. At this time, the VBD module 163 outputs a valid bit detection signal depending on a valid bit detection result.

The collision diagnosis unit 161 determines that the valid bit detection (VBD) signal is positive when the valid bit detection signal is detected. In other words, the collision diagnosis unit 161 determines that a valid bit is detected from the VBD module 163 when the valid bit detection signal is detected.

Meanwhile, the collision diagnosis unit 161 determines that the valid bit detection (VBD) signal is negative when the valid bit detection signal is not detected. In other words, the collision diagnosis unit 161 determines that the valid bit is not detected from the VBD module 163 when the valid bit detection signal is detected.

The collision diagnosis unit 161 determines whether a tag response signal corresponding to a transmitted signal is present on the basis of the valid bit detection signal outputted from the VBD module 163. Therefore, the collision diagnosis unit 161 determines whether the received signal is the tag response corresponding to the transmitted signal or a signal without any signal.

Meanwhile, the collision diagnosis unit 161 further includes an interrogator collision detection (ICD) module 162 which is an interrogator collision detection module that detects a collision of the RFID interrogators. Similar to the VBD module 163, the ICD module 162, a sub-module of the collision diagnosis unit 161, analyzes data of the received signal inputted from the interrogator receiver 140 and calculates an average value with respect to the data of the received signal.

Further, the ICD module 162 detects the collision of the RFID interrogators depending on a comparison result of the average value calculated from the data of the received signal and a registered threshold level. At this time, the ICD module 162 outputs an interrogator collision detection (ICD) signal when the collision of the RFID interrogators is detected.

For example, the ICD module 162 detects that the RFID interrogators collide with each other when the average value calculated from the data of the received signal is equal to or larger than the threshold level. Meanwhile, the ICD module 162 detects that the RFID interrogators do not collide with each other when the average value calculated from the data of the received signal is smaller than the threshold level.

The detailed embodiment thereof will be described with reference to FIGS. 6 and 7.

The collision diagnosis unit 161 can verify whether a collision of the corresponding RFID interrogator and an RFID interrogator adjacent thereto, that is, the third collision occurs on the basis of the interrogator collision detection signal outputted from the ICD module 162. In other words, the collision diagnosis unit 161 determines that the interrogator collision detection (ICD) signal is positive when the interrogator collision detection signal is detected. That is, the collision diagnosis unit 161 determines that the collision of the RFID interrogators is detected from the interrogator collision detection (ICD) module when the interrogator collision detection signal is detected. At this time, the collision diagnosis unit 161 diagnoses when the third collision occurs with respect to the received signal. Meanwhile, the collision diagnosis unit 161 determines that the interrogator collision detection (ICD) signal is negative when the interrogator collision detection signal is not detected. In other words, the collision diagnosis unit 161 determines that the valid bit is not detected from the VBD module 163 when the valid bit detection signal is detected. At this time, the collision diagnosis unit 161 diagnoses when the third collision does not occur with respect to the received signal.

Further, the collision diagnosis unit 161 verifies whether or not a collision of a plurality of adjacent tags, that is, the first collision occurs on the basis of the valid bit detection signal outputted from the VBD module 163 when determining that the interrogator collision detection signal outputted from the ICD module 162 is negative. Further, the collision diagnosis unit 161 can verify whether a collision of a plurality of RFID interrogators and a tag that receives the transmitted signal, that is, the second collision occurs on the basis of the valid bit detection signal outputted from the VBD module 163.

The collision diagnosis unit 161 diagnoses that the first collision occurs with respect to the received signal when determining that the valid bit detection (VBD) signal from the VBD module 163 is positive. The collision diagnosis unit 161 diagnoses that the second collision occurs with respect to the received signal when determining that the valid bit detection (VBD) signal from the VBD module 163 is negative.

The collision diagnosis unit 161 receives the valid preamble detection signal from the interrogator receiver 140 when the valid preamble is detected from the decoder. Further, the collision diagnosis unit 161 receives the CRC error detection signal from the interrogator receiver 140 when the CRC error is detected from the decoder. Herein, the collision diagnosis unit 161 diagnoses a collision type with respect to the received signal on the basis of the valid preamble detection signal and the CRC error detection signal outputted from the interrogator receiver 140.

That is, the collision diagnosis unit 161 can diagnose the collision type with respect to the first collision, the second collision, and the third collision on the basis of the interrogator collision detection signal outputted from the ICD module 162 and the valid bit detection signal outputted from the VBD module 163. The embodiment thereof will be described with reference to Table 1.

TABLE 1

| Collision type Detection | | | |
| --- | --- | --- | --- |
| Signal | First collision | Second collision | Third collision |
| ICD | NEGATIVE | NEGATIVE | POSITIVE |
| VBD | POSITIVE | NEGATIVE | — |

Further, the collision diagnosis unit 161 can diagnose a more specific collision type by further referring to the valid preamble detection signal and the CRC error detection signal inputted from the interrogator receiver 140 in addition to the interrogator collision detection signal outputted from the ICD module 162 and the valid bit detection signal outputted from the VBD module 163. The embodiment thereof will be described with reference to Table 2. Further, the collision diagnosis unit 161 can diagnose a more specific collision type by further referring to the valid preamble detection signal and the CRC error detection signal inputted from the interrogator receiver 140 in addition to the interrogator collision detection signal outputted from the ICD module 162 and the valid bit detection signal outputted from the VBD module 163. The embodiment thereof will be described with reference to Table 2.

TABLE 2

| | Collision type Detection | | | | |
|---|---|---|---|---|---|
| signal | First collision | | Second collision | Third collision | |
| ICD | NEGATIVE | | NEGATIVE | POSITIVE | |
| VBD | POSITIVE | | NEGATIVE | — | |
| VPD | POSITIVE | NEGATIVE | NEGATIVE | POSITIVE | NEGATIVE |
| CRC ERROR | POSITIVE | — | — | POSITIVE | — |

When the above-mentioned condition is satisfied, the collision diagnosis unit 161 determines the collision situation to diagnose any one collision type among the first collision, the second collision, and the third collision and when the above-mentioned condition is not satisfied, the collision diagnosis unit 161 determines when the collision does not occur in the received signal.

At this time, the collision diagnosis unit 161 transfers a collision diagnosis result to the collision resolution unit 165. Herein, the collision diagnosis result includes occurrence of the collision or not and when the collision occurs, the collision diagnosis result includes information on the collision type.

The collision resolution unit 165 performs an operation corresponding to the collision diagnosis result applied from the collision diagnosis unit 161. In other words, when the collision diagnosis unit 161 diagnoses that the collision does not occur, the collision resolution unit 165 reports the diagnosis result to the interrogator controller 110. Further, when any one among the tag on tag collision, the multiple interrogators to tag collision, and the interrogator to interrogator collision occurs, the collision resolution unit 165 resolves the collision problem by performing a collision resolution algorithm corresponding to each collision type. The collision resolution unit 165 includes a situational command retransmission portion 1651 that determines whether or not the command is retransmitted based on the occurrence of the collision or not and the collision type and a random wait time calculating unit 1652 that calculates a random wait time for retransmitting the command. The detailed operation of the collision resolution unit 165 will be described after the collision diagnosis unit 161's collision diagnosis operation is described.

Figure 5:
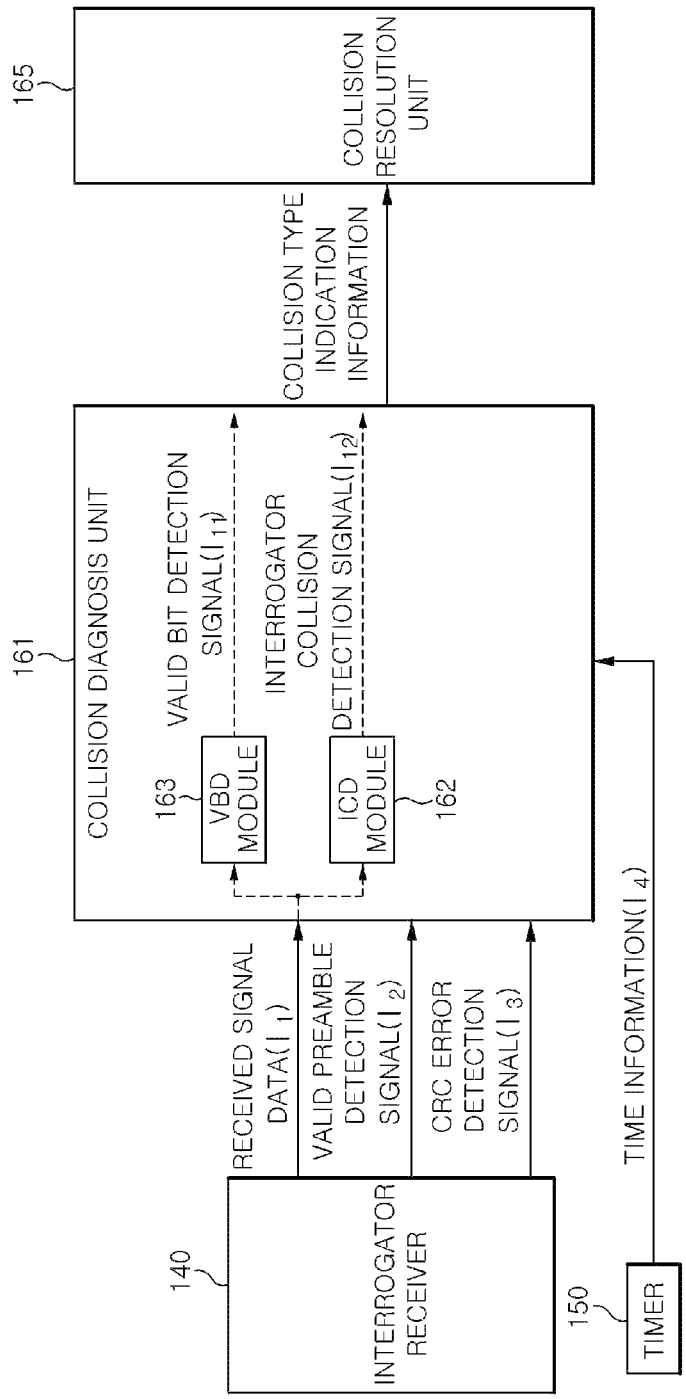

FIG. 5 is a diagram referenced for describing the operation of the collision controller according to the present invention.

Referring to FIG. 5, the collision diagnosis unit 161 receives received signal data I1 from the interrogator receiver 140. At this time, the VBD module 163 of the collision diagnosis unit 161 outputs a valid bit detection signal I11 by detecting the valid bit from the received signal data. Further, the ICD module 162 of the collision diagnosis unit 161 outputs an interrogator collision detection signal I12 by detecting the interrogator collision from the received signal data.

Meanwhile, the collision diagnosis unit 161 receives a valid preamble detection signal I2 and a CRC error detection signal I3 from the interrogator receiver 140.

Further, the collision diagnosis unit 161 receives time information I4 from the timer 150. At this time, the collision diagnosis unit 161 counts the time until a received time set with respect to the transmitted signal is timed out on the basis of the time information I4 provided from the timer 150. Further, the collision diagnosis unit 161 counts the time until a tag response corresponding to the transmitted signal is received.

The collision diagnosis unit 161 diagnoses the occurrence of the collision or not and the occurring collision type with respect to the received signal by using information on the valid bit detection signal I11, the interrogator collision detection signal I12, the valid preamble detection signal I2, and the CRC error detection signal I3.

At this time, the collision diagnosis unit 161 outputs the collision diagnosis result to the collision resolution unit 165. Herein, the collision diagnosis result includes information of no collision detected, the first collision, the second collision, and the third collision. Of course, the collision diagnosis result may include the collision control command for resolving the diagnosed collision.

Figure 6:
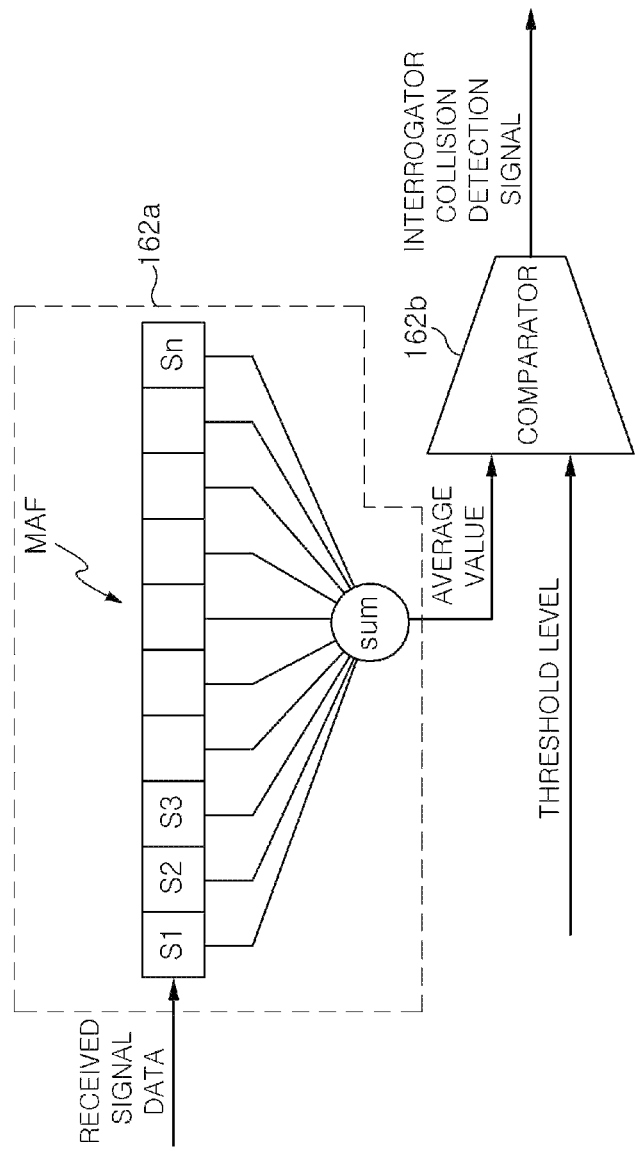
Figure 7:
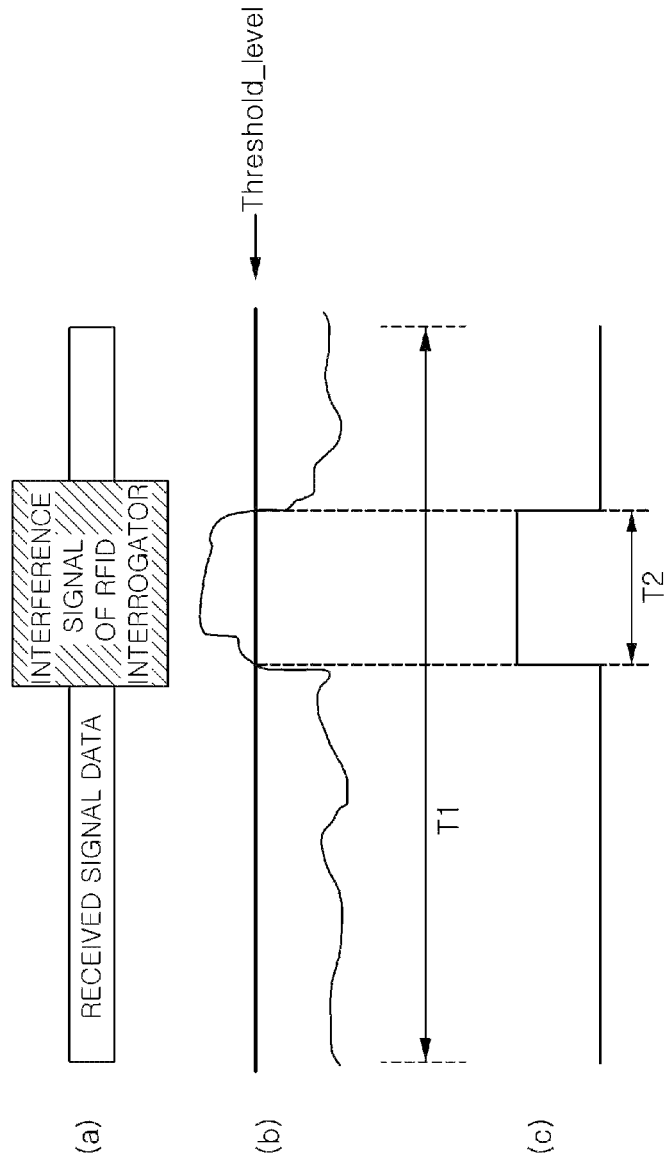

FIGS. 6 and 7 are diagrams referenced for describing the operation to detect the ICD in the ICD module of the collision diagnosis unit.

The collision diagnosis unit 161 adjusts a parameter value of the ICD module 162 before detecting the ICD signal.

For example, the collision diagnosis unit 161 determines a window (or tap) size of a moving average filter (MAF) from a link frequency (LF), a data rate, a signal modulation type, etc. Herein, it is possible to manually or automatically adjust the size of the window which is a section where an average value for the received signal data is calculated.

The collision diagnosis unit 161 determines a tag response cycle for receiving the tag response to the transmitted signal. Herein, the tag response cycle is determined from the link frequency, the data rate, the modulation type, etc.

Further, the collision diagnosis unit 161 determines a threshold level which is a reference for detecting the interrogator signal in the ICD module 162. Herein, the threshold level is determined by at least one of the signal modulation type, the link frequency (LF), the data rate, etc.

As described above, after the parameter value of the ICD module 162 is determined by the collision diagnosis unit 161, the ICD module 162 checks whether or not the RFID interrogators collide with each other with respect to symbol data of the received signal inputted from the interrogator receiver 140.

FIG. 6 is an exemplary diagram illustrating the configuration of the ICD module according to the present invention and FIG. 7 illustrates a flow of a signal in the ICD module. Referring to FIGS. 6 and 7, the ICD module 162 includes an average calculation unit 162a and a comparator 162b.

The average calculating unit 162*a* receives the received signal data inputted from the interrogator receiver 140 as an input value and calculates an average value for the inputted received signal data. At this time, the average calculation unit 162*a* includes the moving average filter (MAF). That is, when the received signal data is inputted into the moving average filter, the average calculation unit 162*a* calculates the average value by summing up filter values (S1, S2, S3, . . . , Sn) inputted into a window of the moving average filter. That is, the average value of the section inputted into the window of the moving average filter is calculated. If the received signal data is additionally inputted into the window of the moving average filter, an average value for the additionally inputted received signal data is calculated.

The comparator 162*b* outputs the interrogator collision detection signal by comparing the average value calculated from the average calculation unit 162*a* and the threshold level. At this time, the comparator 162*b* outputs the interrogator collision detection signal for an average value that is equal to or larger than the threshold level among the average values calculated from the average calculation unit 162*a*. At this time, the collision diagnosis unit 160 regards that the corresponding interrogator collision detection signal, that is, the ICD is positive.

That is, the collision diagnosis unit 161 considers that the third collision occurs between the corresponding RFID interrogator and the RFID interrogator adjacent thereto when the ICD is positive in the interrogator collision detection signal. At this time, the value of the ICD indicates interrogators that collide with each other.

In other words, in the case in which the symbol data of the received data is inputted as shown in FIG. 7(*a*), the average value of the moving average filter section for the received signal data inputted during the tag response time T1 determined by the collision diagnosis unit 160 is shown in FIG. 7(*b*). Herein, the collision diagnosis unit 160 receives the received signal from the RF communicator 130 during a set receive time after transmitting the transmitted signal. In the embodiment, the collision diagnosis unit 160 receives the received signal during the tag response time T1.

At this time, the ICD module 162 compares the average values of (b) with the threshold level previously determined by the collision diagnosis unit 161. As a result, the ICD module 162 outputs the interrogator collision detection signal to the collision diagnosis unit 161 as shown in FIG. 7(*c*). That is, it can be verified that the ICD is positive at 'T2' which is a region which is larger than the threshold value among the average values during 'T1' which is the tag response time.

Therefore, the collision diagnosis unit 161 determines that the third collision occurs in the received signal on the basis of the interrogator collision detection signal outputted from the ICD module 162.

Figure 8:
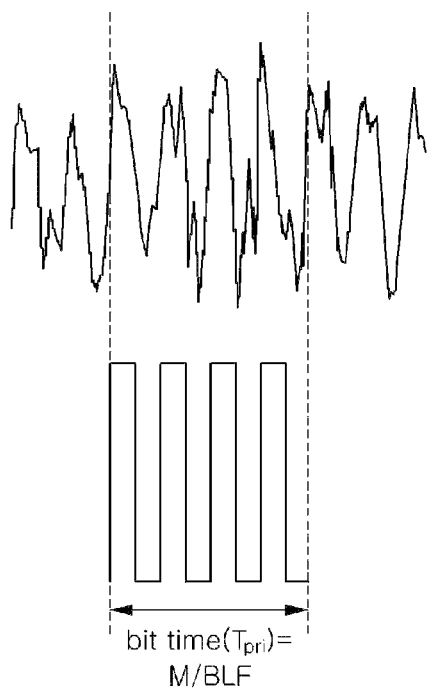

FIG. 8 illustrates an embodiment that detects the valid bit in the VBD module. In particular, FIG. 8 illustrates an example in which the valid bit is detected in a received signal encoded by Miller-4.

Herein, when the valid bit is detected by the VBD module 163, the VBD is 'positive' and when the valid bit is not detected, the VBD is 'negative'. The VBD module 163 outputs the valid bit detection signal depending on the valid bit detection result. Therefore, the collision diagnosis unit 161 diagnoses the collision type of the received signal on the basis of the valid bit detection signal outputted from the VBD module 163.

Figure 9:
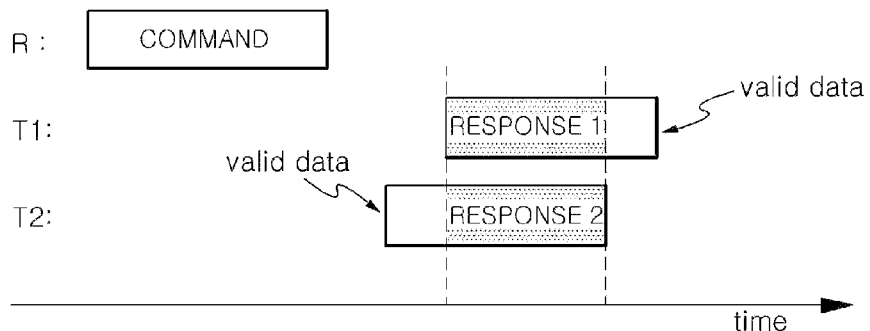
Figure 10:
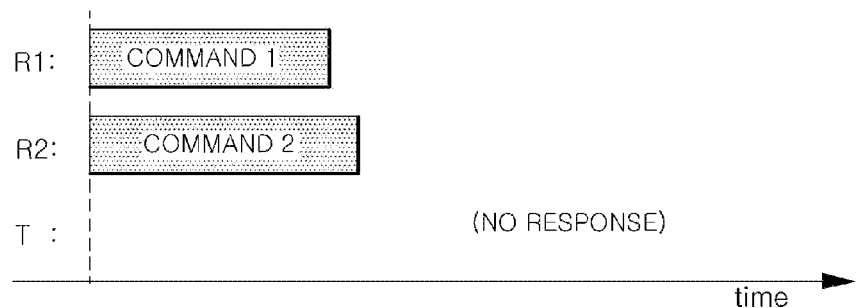

Accordingly, the collision diagnosis unit 161 can diagnose the collision types of FIGS. 9 to 11 from the previously obtained information, that is, the interrogator collision detection signal, the valid bit detection signal, the valid preamble detection signal, and the CRC error detection signal.

First, FIG. 9 illustrates a first collision situation and more particularly, illustrates commands and response signals that are transmitted and received between the RFID interrogator R and a tag 1 T1 and a tag 2 T2. However, a state in which interferences of other RFID interrogators are not detected is considered.

First, when the RFID interrogator R transmits the commands to the tag 1 T1 and the tag 2 T2, the tag 1 T1 and the tag 2 T2 transmit a response 1 and a response 2 to the RFID interrogator R, respectively. At this time, parts of two or more tag responses, that is, the response 1 and the response 2 overlap each other, such that the collision occurs.

At this time, the collision diagnosis unit 161 diagnoses that the first collision occurs when the following <Condition A> or <Condition B> is satisfied.

<Condition A>
1) Valid preamble detected (VPD is positive)
2) CRC error is detected.
3) Valid bit detected (VBD is positive)
4) No interrogator collision detected (ICD is negative)
<Condition B>
1) No Valid preamble detected (VPD is negative)
2) Valid bit detected (VBD is positive)
3) No interrogator collision detected (ICD is negative)

In other words, like <Condition A>, when the conditions that the VPD is 'positive' from the valid preamble detection signal, the CRC error is detected, the VBD is 'positive' from the valid bit detection signal, and the ICD is 'negative' from the interrogator collision detection signal are satisfied, the collision diagnosis unit 161 diagnoses that the first collision occurs in the received signal. Meanwhile, like <Condition B>, when the conditions that the VPD is 'negative', the VBD is positive, and the ICD is 'negative' are satisfied, the collision diagnosis unit 161 diagnoses that the first collision occurs in the received signal.

Accordingly, the collision diagnosis unit 161 outputs the collision diagnosis result including first collision information to the collision resolution unit 165 when any one of <Condition A> and <Condition B> is satisfied.

FIG. 10 illustrates a second collision situation and more particularly, illustrates commands and response signals that are transmitted and received between an interrogator 1 and an interrogator 2 and one tag.

As shown in FIG. 10, an RFID interrogator 1 R1 and an RFID interrogator 2 R2 output the commands to the tag T. At this time, when a command 1 and a command 2 outputted from the RFID interrogator 1 R1 and the RFID interrogator 2 R2, respectively, overlap each other, the collision occurs. In this case, since the tag cannot detect the command of the valid RFID interrogator, the tag response is not outputted. Therefore, after the RF communicator 130 transmits the transmitted signal, the RF communicator 130 receives signals or noises of other RFID interrogators.

At this time, the collision diagnosis unit 161 diagnoses that the second collision occurs when the following <Condition C> is satisfied.

<Condition C>
1) No valid preamble detected (VPD is negative)
2) No valid bit detected (VBD is negative)
3) No interrogator collision detected (ICD is negative)

Like the <Condition C>, when the conditions that the VPD is 'negative', the VBD is 'negative', and the ICD is 'negative' are satisfied, the collision diagnosis unit 161 diagnoses that the second collision occurs in the received signal.

Accordingly, the collision diagnosis unit 161 outputs the collision diagnosis result including second collision information to the collision resolution unit 165 when the <Condition C> is satisfied.

FIG. 11 illustrates a third collision situation and more particularly, illustrates commands and response signals that are transmitted and received between the interrogator 1 and the interrogator 2 and one tag.

First, when the RFID interrogator 1 R1 transmits the command 1 to the tag T, the tag T transmits the response 1 to the RFID interrogator 1 R1 in response to the command 1 of the RFID interrogator 1 R1. Meanwhile, the RFID interrogator 2 R2 transmits the command 2 to other tags.

At this time, since the read range of the RFID interrogator 1 R1 and the interference range of the RFID interrogator 2 R2 overlap each other, the response 1 of the tag T and the command 2 of the RFID interrogator 2 R2 overlap each other, such that the collision occurs. FIG. 11(a) illustrates a case in which a part of the response 1 and the command 2 overlap each other and FIG. 11(b) illustrates a case in which the entirety of the response 1 and the command 2 overlap each other. Herein, FIGS. 11(a) and 11(b) occur depending on a transmitted actual timing of a protocol data unit.

At this time, the collision diagnosis unit 161 diagnoses that the third collision occurs when the following <Condition D> or <Condition E> is satisfied.

<Condition D>
1) Valid preamble detected (VPD is positive)
2) CRC error is detected.
3) Interrogator collision detected (ICD is positive)

<Condition E>
1) No valid preamble detected (VPD is negative)
2) Interrogator collision detected (ICD is positive)

First, like <Condition D>, when the VPD is 'positive', the CRC error is detected, and the ICD is 'positive', the collision diagnosis unit 161 diagnoses that the third collision occurs in the received signal. Meanwhile, like <Condition E>, when the VPD is negative and the ICD is 'positive', the collision diagnosis unit 161 diagnoses that the third collision occurs in the received signal.

Herein, since the ICD is a signal that basically detects the collision between the corresponding RFID interrogator and the RFID interrogator adjacent to, the ICD is 'positive? only in the third collision. Accordingly, the collision diagnosis unit 161 outputs the collision diagnosis result including third collision information to the collision resolution unit 165 when the <Condition D> or the <Condition E> is satisfied.

Thereafter, the collision resolution unit 165 resolves the collision diagnosed by the collision diagnosis unit 161 and performs the collision resolution algorithm corresponding to the type of the occurring collision to minimize the occurring collision. The collision resolution unit 165 transmits the performance result to the interrogator controller 110 after performing the collision resolution algorithm.

The above-configured operation of the present invention will now be described.

Figure 12:
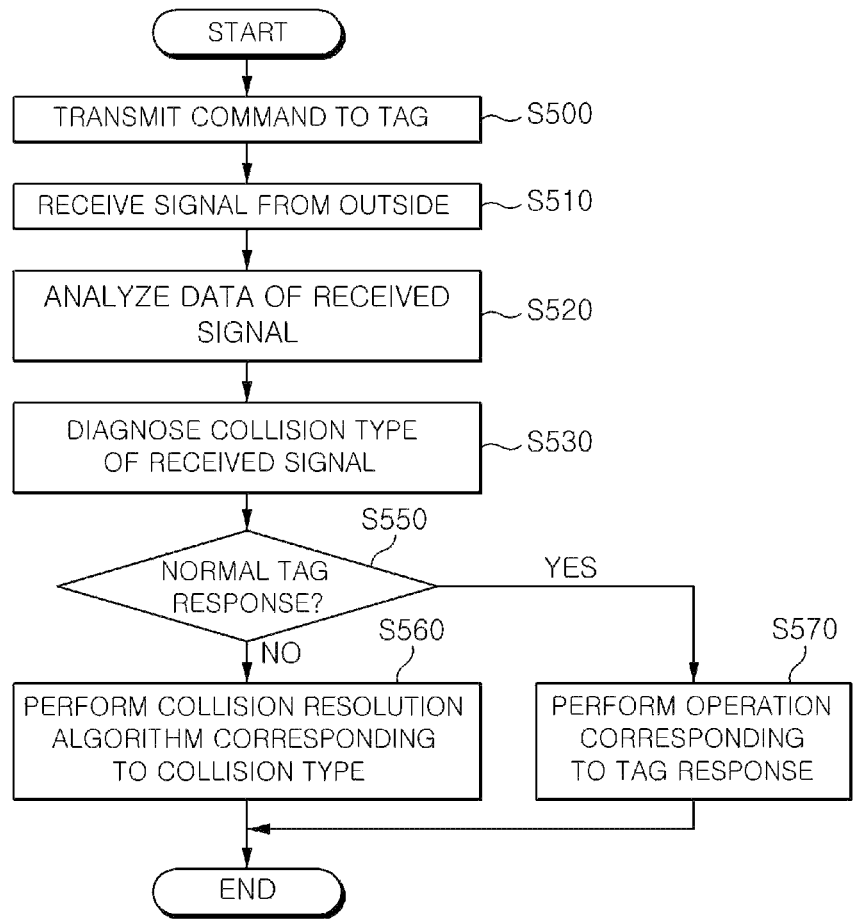
FIGS. 12 to 14 are flowcharts illustrating an operation flow of an RFID interrogator according to the present invention.
Figure 14:
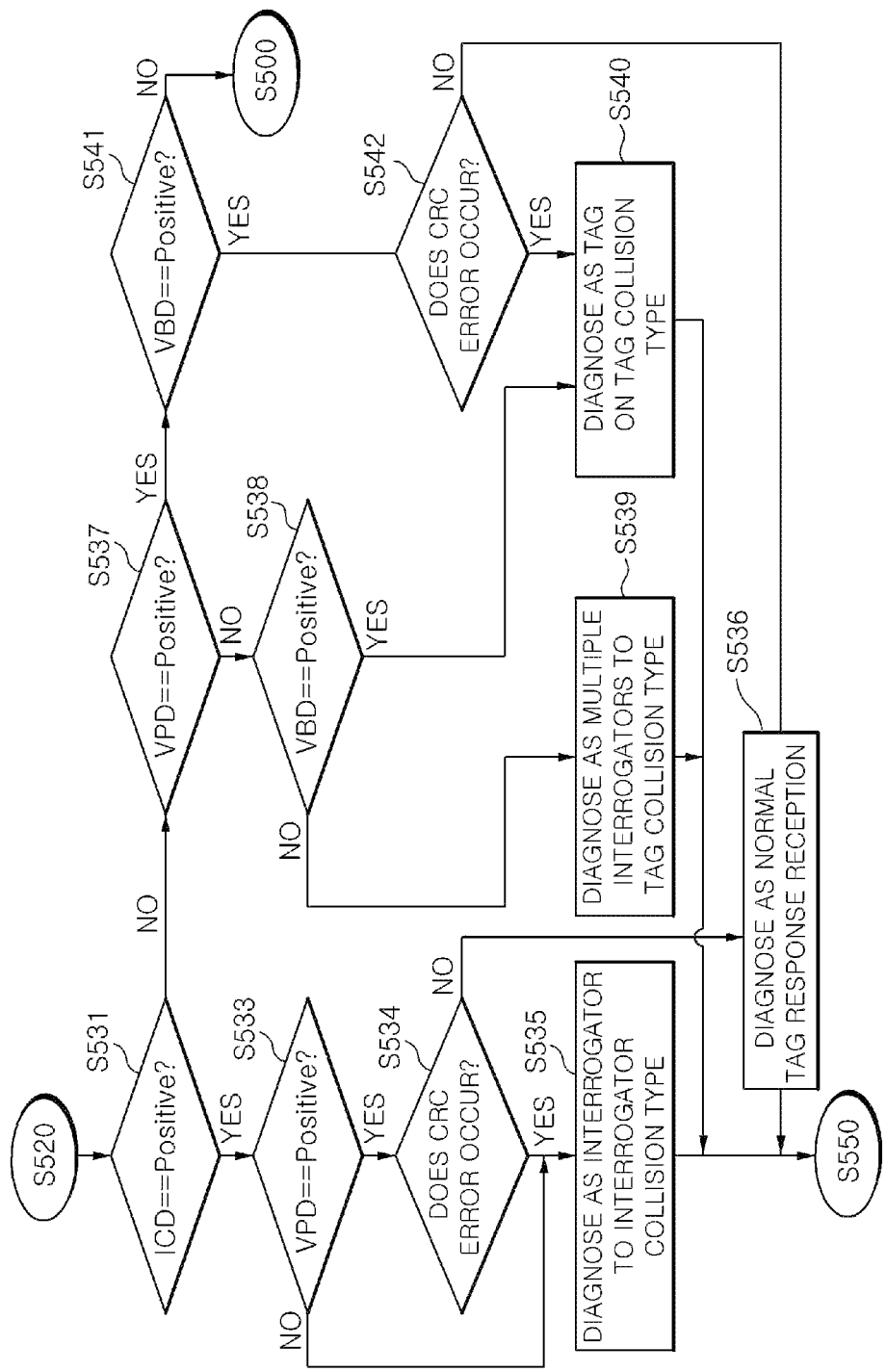

FIGS. 12 and 14 are flowcharts illustrating an operation flow of an RFID interrogator according to an embodiment of the present invention.

First, FIG. 12 illustrates an entire operation flow of an RFID interrogator. Referring to FIG. 12, the RFID interrogator transmits a transmitted signal, that is, an inventory command to a tag adjacent thereto (S500). An RF communicator 130 of the corresponding RFID interrogator receives a signal from the outside during a set received time corresponding to the transmitted signal transmitted at step 'S500' (S510). At this time, the RF communicator 130 receives a tag response signal from at least one tag within a read range of the corresponding RFID interrogator. Of course, the signal received at step 'S510' may include signals or noise of other RFID interrogators in addition to the tag response signal.

A collision diagnosis unit 161 of the RFID interrogator analyzes data of the received signal received at step 'S510' (S520) and diagnoses occurrence of a collision or not and a collision type of the received signal (S530).

If, as a diagnosis result at step 'S530', the corresponding received signal is determined to be a normal tag response signal (S550), the collision diagnosis unit 161 outputs a signal indicating the determination to the collision resolution unit 165. At this time, the collision resolution unit 165 transmits the collision diagnosis result of the collision diagnosis unit 161 to an interrogator controller 110, such that the interrogator controller 110 performs an operation corresponding to the tag response (S570).

Meanwhile, if, as the diagnosis result at step 'S530', it is determined that the collision occurs in the corresponding received signal (S550), the collision diagnosis unit 161 outputs the collision diagnosis result to the collision resolution unit 165. At this time, the collision resolution unit 165 performs a collision resolution algorithm corresponding to the corresponding collision type on the basis of the collision diagnosis result of the collision diagnosis unit 161.

Figure 13:
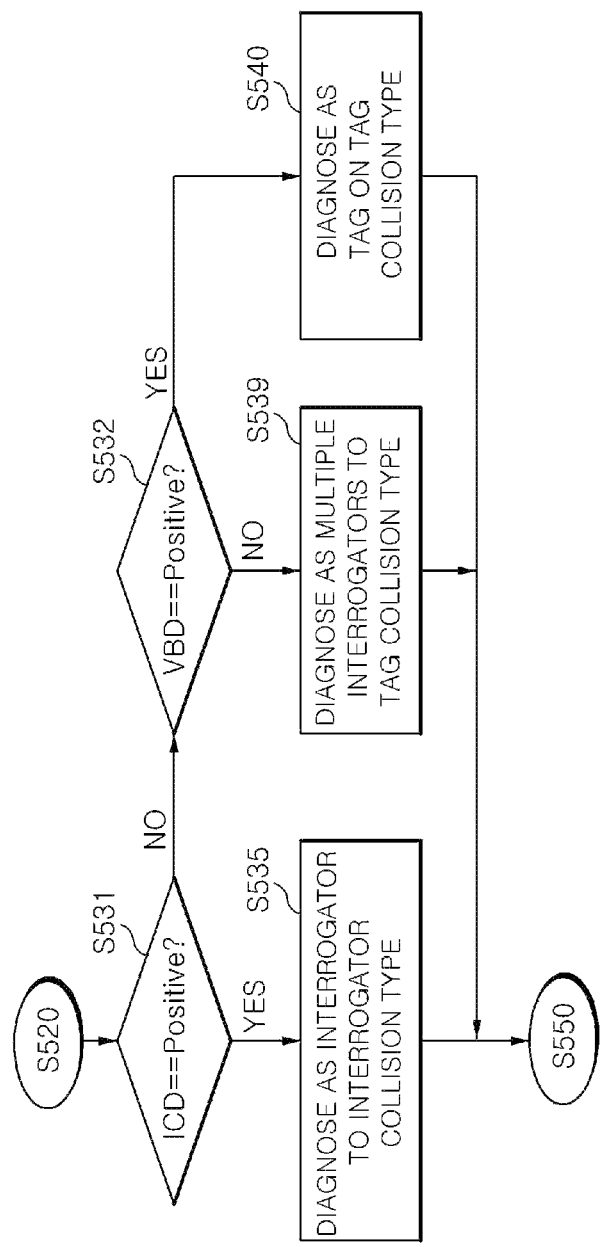

FIGS. 13 and 14 illustrate a detailed process of step 'S530' in FIG. 12. FIG. 13 illustrates a simplified operation flow. FIG. 14 illustrates a further subdivided operation flow of FIG. 13. First, referring to FIG. 13, the collision diagnosis unit 161 analyzes data of a received signal inputted from an interrogator receiver 140 and diagnoses the collision type occurring in the received signal on the basis of an interrogator collision detection signal outputted from an ICD module 162 and a valid bit detection signal outputted from a VBD module 163.

If 'ICD==positive' on the basis of the interrogator collision detection signal outputted from the ICD module 162 (S531), the collision diagnosis unit 161 diagnoses the collision type of the received signal as a 'third collision type' that is, an interrogator to interrogator collision type.

Meanwhile, if it is not 'ICD==positive' on the basis of the interrogator collision detection signal outputted from the ICD module 162 (S531), the collision diagnosis unit 161 proceeds to step S532 and checks whether or not 'VBD==positive'. If it is verified that 'VBD==positive' from the valid bit detection signal outputted from the VBD module 163 (S532), the collision diagnosis unit 161 diagnoses the collision type of the received signal as a 'first collision type', that is, a tag to tag collision type (S540). On the contrary, if not 'VBD==positive' (S532), the collision diagnosis unit 161 diagnoses the collision type of the received signal as a 'second collision type', that is, a multiple interrogators to tag collision type (S539).

Referring to FIG. 14, the collision diagnosis unit 161 proceeds to step 'S533 and checks whether or not 'VPD==positive' if 'ICD==positive' on the basis of the interrogator collision detection signal outputted from the ICD module 162 (S531). When it is verified that it is not 'VPD==positive', the collision diagnosis unit 161 diagnoses the collision type of the received signal as the 'third collision type', that is, the interrogator to interrogator collision type (S535). Meanwhile, if 'VPD==positive' at step 'S533', the collision diagnosis unit 161 proceeds to step 'S534' and checks whether or not a CRC error occurs. When it is verified that the CRC error occurs, the collision diagnosis unit 161 diagnoses the collision type of the received signal as the 'third collision type', that is, the interrogator to interrogator collision type (S535). At this time, when it is verified that the CRC error does not occur at step 'S534', the collision diagnosis unit 161 diagnoses that the received signal is the normal tag response (S536). Meanwhile, when it is verified that it is not 'ICD=positive' at step 'S531', the collision diagnosis unit 161 proceeds to step 'S537' and checks whether or not 'VPD=positive'. If it is not 'VPD=positive', the collision diagnosis unit 161 proceeds to step 'S538' and checks whether or not 'VBD=positive'. If 'VBD=positive', the collision diagnosis unit 161 diagnoses the collision type of the received signal as the 'first collision type', that is, the tag to tag collision type (S540). On the contrary, if it is not 'VBD=positive', the collision diagnosis unit 161 diagnoses the collision type of the received signal as the 'second collision type', that is, the multiple interrogators to tag collision type (S539).

Meanwhile, when it is verified that 'VPD=positive' at step S537, the collision diagnosis unit 161 proceeds to step 'S541' and checks whether or not 'VBD=positive'. If 'VBD=positive', the collision controller 161 proceeds to step 'S542' and checks whether or not the CRC error occurs. When it is verified that the CRC error occurs, the collision diagnosis unit 161 diagnoses the collision type of the received signal as the 'first collision type', that is, the tag to tag collision type (S540). At this time, when it is verified that the CRC error does not occur at step 'S542', the collision diagnosis unit 161 diagnoses that the received signal is the normal tag response (S536).

Meanwhile, if it is not 'VBD=positive' at step 'S541', the collision diagnosis unit 161 proceeds to step 'S500' of FIG. 12 and reperforms step 'S500' to step 'S570'.

Next, as described above, the collision diagnosis unit 161 determines whether or not the collision occurs and when the collision occurs, the collision diagnosis unit 161 determines which type among three collision types according to the present invention the collision belongs to. Thereafter, a method in which the collision resolution unit 165 that receives the determination result resolves the collision is described.

First, a media accessing method according to the present invention will now be described in brief. The RFID interrogator can start an inventory round when a ready is made regardless of current occupancy of a selected frequency band or not. That is, LBT is not required as long as a separated channel is not allocated to a mobile RFID. Further, synchronization is not required between interrogators that perform transmission within the same channel. That is, the present invention can be applied even without securing a predetermined control channel. It is a key point of the present invention to perform command retransmission depending on a collision situation in combination with an adaptive retransmission wait time.

Figure 15:
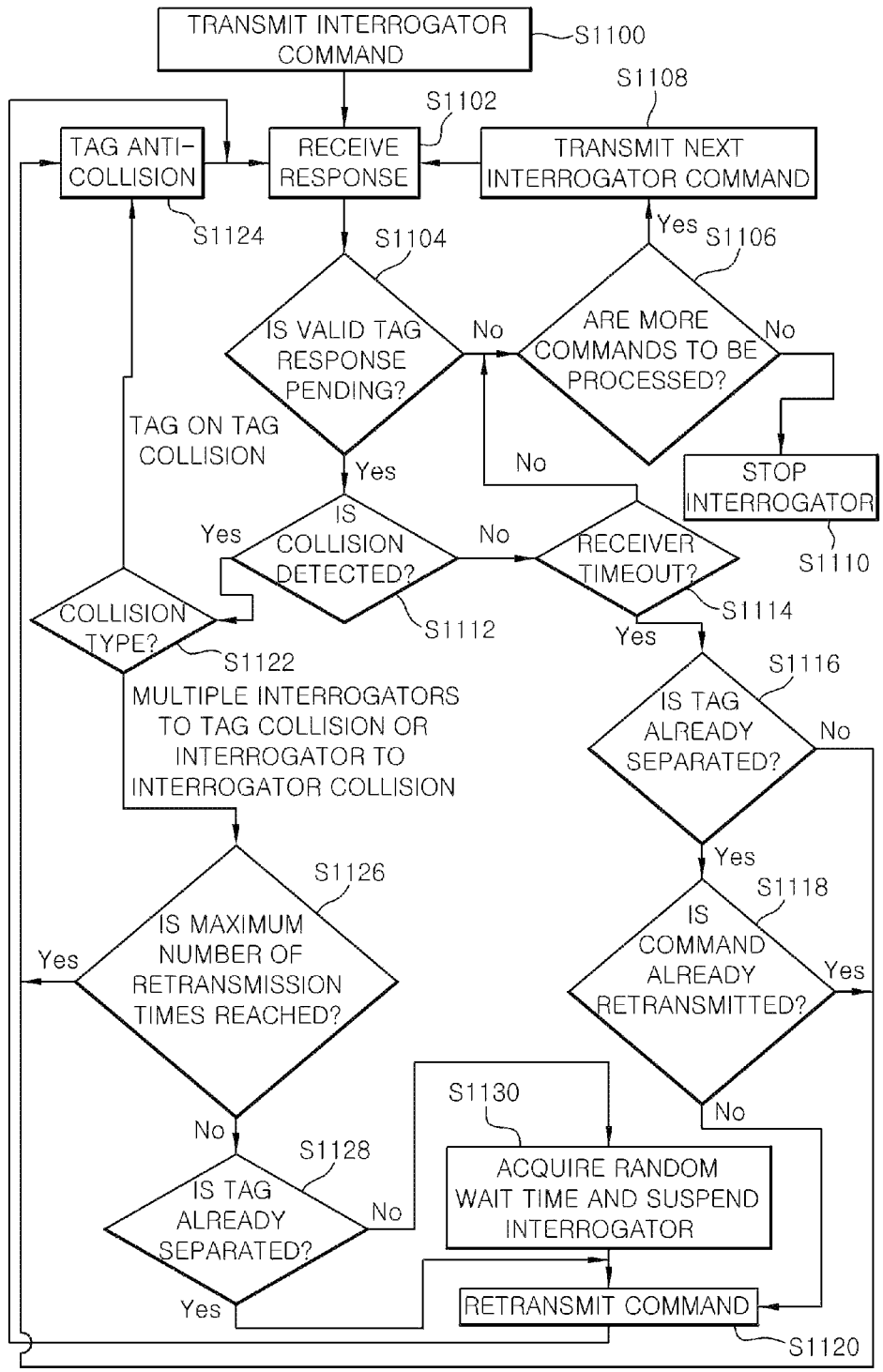
FIG. 15 is a flowchart illustrating a process in which a collision resolution unit retransmits commands for each collision situation according to an embodiment of the present invention.

FIG. 15 is a flowchart illustrating a process in which a collision resolution unit retransmits commands for each collision situation according to an embodiment of the present invention. The process shown in FIG. 15 is performed principally by a situational command retransmission portion 1651 of FIG. 4. The random wait time calculation portion 1652 of FIG. 4 calculates a random wait time adopted in retransmitting the command for each collision situation and transmits the random wait time to the situational command retransmission portion 1651.

A basic content of the command retransmission for each collision situation will be described below. First, when the multiple interrogators to tag collision or the interrogator to interrogator collision is detected, the command is retransmitted. In addition, after the collision is detected, the interrogator is subjected to suspension during a random time before retransmitting the command. Since the collision is not detected while the RFID interrogator retransmits the command, collision arbitration can start after transmission of the command is completed. That is, it is assumed that the transmission of the command in progress is not interrupted in mid course.

Further, when, for example, a receiver timeout such as a $T_2$ timeout is detected, the command is retransmitted. The receiver timeout means that a receiver active time triggered by a tag state machine is terminated because there is no valid RF modulation, encoding, or message structure or there is no activity on a communication channel. When the receiver timeout is provided, the interrogator retransmits the command.

The collision arbitration according to the present invention is implemented by retransmitting the command at least one time. In addition, when a damaged tag response is repetitively received, the command can be retransmitted several times. In order to reduce a possibility of a subsequent collision, after the collision is detected, collision avoidance can be implemented by suspending the interrogator during the random wait time.

Further, after the tag is separated into a current response slot, that is, during tag acknowledgement (ACK) and tag access periods, when a communication collision is detected by the interrogator, relevant commands are retransmitted in order to resolve the multiple interrogators to tag collision or the interrogator to interrogator collision.

During a tag anti-collision step, when the interrogator cannot determine the multiple interrogators to tag collision or the interrogator to interrogator collision by using an appropriate means, the command will be not retransmitted. That is, the interrogator that does not have a collision diagnosis function which can discriminate three types of the communication collision like the collision diagnosis unit 161 may be subjected to prohibition of the command retransmission. Instead, a general tag anti-collision for resolving the tag to tag collision occurring by several tags that perform the response in the same communication slot is adopted.

The number of times at which the retransmission is tried after the collision may be not particularly limited and may be appropriately adjusted depending on an application purpose. In order to avoid a continuously repeated communication traffic problem and the resultant communication collision, it is preferable to set an upper threshold in the number of times in which the retransmission is failed when the collision occurs.

Further, when the interrogator detects the receiver timeout (the tag response cannot be received with a predefined time), the command is retransmitted at only one time. It is a key point of the present invention not to repetitively retransmit the command in the case of the receiver timeout. Instead, when the receiver timeout is consistent, the general anti-collision is adopted. For example, before the command is retransmitted (reissued) in order to recover from the multiple interrogators to tag collision, in the case in which a yet undetected tag which is anticipated to be present within an interrogator region is provided, it is verified that at least one tag that is permitted to respond to the interrogator is present in the current slot by reducing the number of slots.

Further, the command retransmission according to the present invention is only considered to have value when the relevant tag can receive the command. In a state in which the tag is easy to receive the command, for example, an internal state is not changed by the receiver timeout, the command retransmission has value. In the case of a UHF air interface specified by ISO/IEC 18000-6 Type C, when the $T_2$ timeout is provided in a reply state or acknowledged state, the tag is switched to an arbitration state. At this time, since the tag response is not provided even though the command is retransmitted after a wait time of $T_2$ or longer, an effect thereof cannot be anticipated.

Accordingly, when the anticipated internal state of the tag determined by the command does not cause the timeout or the wait time selected for the command retransmission is smaller than a minimum value of the timeout specified in the air interface specification, the command is retransmitted. The interrogator can automatically resolve the latent problem in advance by performing the suspension during the random wait time only at an early step of the inventory round, that is, providing an additional limit so as not to perform the suspension any longer during the random wait time when one or more tag is separated.

The command retransmission for each collision situation according to the present invention will be described in detail with reference to the flowchart schematically illustrating the process in which the collision resolution unit retransmits the command for each collision situation, which is shown in FIG. 15.

First, the interrogator transmits the command at step S1100. In addition, the interrogator receives the response at step S1102. Of course, step S1102 also includes a case in which a response to be received is not provided or the response cannot be received. Next, the process proceeds to step S1104 and determines whether or not a valid tag response is pending. When the valid tag response is pending, this means a case in which the tag must perform the response in the current slot in the case of, for example, Query, QeuryAdjust, and QueryRep commands. In this case, it is determined that the valid tag response is pending. As the determination result at step S1104, when it is determined that the valid tag response is not pending, for example, the tag response needs not to be received, the process proceeds to step S1106. Step S1104 may be adopted in a different scheme and may be omitted depending on a design.

At step S1106, it is determined whether or not there are more commands that the interrogator must process. In the case in which there are more commands to be processed, the process proceeds to step S1108 and in the case in which there is no command to be processed, the process proceeds to step S1110 and stops the interrogator.

Meanwhile, when it is determined that the valid tag response is pending at step S1104, the process proceeds to S1112. Step S1112 is a collision detection step in which the occurrence of the collision or not and the collision type are determined by the collision diagnosis unit according to the present invention. When the collision occurs as the determination result of the collision diagnosis unit, the process proceeds to step S1122 while the occurrence of the collision or not and the determined collision type are transmitted to the collision resolution unit and when it is determined that the collision does not occur as the determination result of the collision diagnosis unit, the process proceeds to step S1114 while a signal indicating that the collision does not occur is transmitted to the collision resolution unit.

First, a process after step S1114 which is in progress when the collision is not detected as the determination result in step S1112 will be described. At step S1114, whether it is the receiver timeout or not is determined. As the determination result, if it is not the receiver timeout, the process proceeds to step S1106 and processes a subsequent command and if it is the receiver timeout, the process proceeds to step S1116.

At step S1116, it is determined whether or not the tag has already been separated. When the tag is separated, this means that the tag is separated into the current response slot. For example, the tag ACK and the tag access section correspond thereto. As the determination result at step S1116, when it is determined that the tag is not yet separated, the command retransmission according to the present invention is not performed and the process proceeds to step S1124 and performs a general tag anti-collision process. That is, according to the present invention, an interrogator that is yet at an initial step of the inventory round does not perform the command retransmission, such that another interrogator may complete the inventory round earlier than the interrogator.

Meanwhile, as the determination result at step S1116, when it is determined that the tag has been already separated, the process proceeds to S1118. At step S1118, it is determined whether or not the corresponding command has already been retransmitted. As the determination result at step S1118, when it is determined that the corresponding command has already been retransmitted, the process proceeds to step S1124 and performs a tag anti-collision process. Meanwhile, as the determination result at step S1118, when it is determined that the corresponding command has never been retransmitted, the process proceeds to step S1120 and retransmits the corresponding command. That is, the interrogator detects the receiver timeout and when the tag has already been separated, the interrogator retransmits the command only once. Therefore, in the case of the receiver timeout, the command is not repetitively retransmitted and when the receiver timeout is provided even after one-time command retransmission, the general tag anti-collision is performed. Meanwhile, the process returns to step S1112 and as the determination result at step S1112, when it is determined that the collision occurs, the collision resolution unit receives the collision type (any one of the three collision types according to the present invention) and the process proceeds to step S1122. At step S1122, depending on the collision type, the process determines whether it proceeds to step S1124 to perform the tag anti-collision or proceeds to steps subsequent to step S1126 to perform the command retransmission. If the collision type is the 'tag on tag collision' the process proceeds to step S1124 and performs the tag anti-collision. If the collision type is the 'multiple interrogators to tag collision' or 'interrogator to interrogator collision' the process performs steps subsequent to step S1126. If the collision type is the multiple interrogators to tag collision or interrogator to interrogator collision, it is determined whether or not the number of retransmission times reaches the maximum number of retransmission times at step S1126. The maximum number of retransmission times is determined by the design and may be changed depending on the application. Continuously repeated retransmission may be prevented by limiting the maximum number of retransmission times, but the limitation is not a requisite. As the determination result at step S1126, when it is determined that the number of retransmission times reaches the maximum number of retransmission times, the process proceeds to step S1124 and performs the tag anti-collision without the command retransmission.

As the determination result at step S1126, if it is determined that the number of retransmission times does not reach the maximum number of retransmission times, the process proceeds to step S1128. As the determination result at step S1128, when it is determined that the tag has already been separated, the process proceeds to step S1120 and retransmits the command without suspending the interrogator and when it is determined that the tag is not yet separated, for example, at the initial step of the inventory round, the process proceeds to step S1130 to acquire the random wait time and suspend the interrogator as long as the acquired random wait time.

At step S1130, the random wait time is calculated by the random wait time calculation portion 1652 of FIG. 4, the calculated random wait time is acquired, and the interrogator is suspended as long as the acquired random wait time. The calculation method of the random wait time, which is performed by the random wait time calculation portion 1652 will be described below in detail. The interrogator that is suspended as long as the random wait time by performing step S1130 proceeds to step S1120 to retransmit the command and returns to step S1102 to receive the response. The process described with reference to FIG. 15 is exemplary and may be partially modified and omitted within the scope without departing from the spirit of the present invention.

FIG. 16 illustrates a pseudo code notation of a collision resolution algorithm described by referring to FIG. 15, which is prepared similar to a scheme used in C-language. The pseudo-code notation is prepared by using concepts and terms of the mobile RFID interrogator, which are specified by the air interface specification determined in ISO/IEC 18000-6 Type C. The proposed code is used for exemplary description and does not limit the scope of the present invention. FIG. 16, which is used for reference, represents the processes shown in FIG. 15 as codes, such that the detailed description thereof will be omitted. Those skilled in the art will be able to easily appreciate FIG. 16 with reference to the description of the present invention. FIG. 16 illustrates the codes assuming that the interrogator is activated at all times. A function of anticollision( ) illustrates a collision arbitration mechanism of a known air interface specification. Of course, it is possible to issue an additional inventory command such as QueryAdjust or QueryRep in the case of the receiver timeout by checking several preconditions including that the number of slots must be larger than 1 in order to perform the function of anticollision( ).

Figure 17:
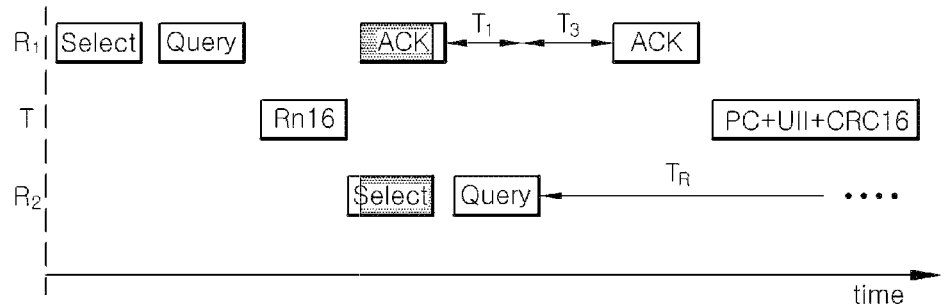
FIGS. 17 to 19 are exemplary timing diagrams for illustrating a collision resolving method depending on each collision situation according to an embodiment of the present invention.
Figure 18:
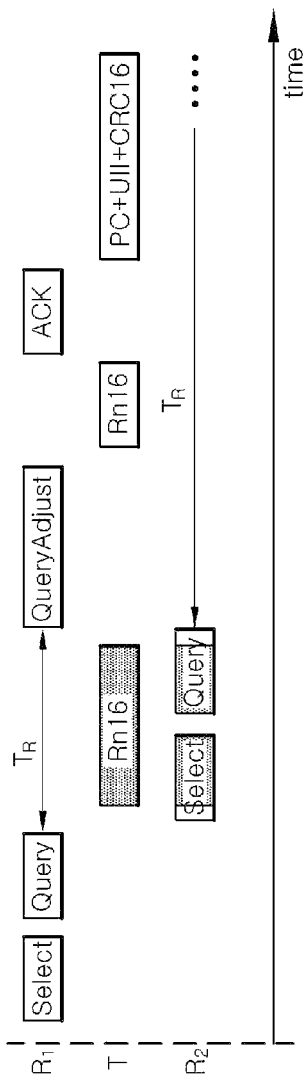
Figure 19:
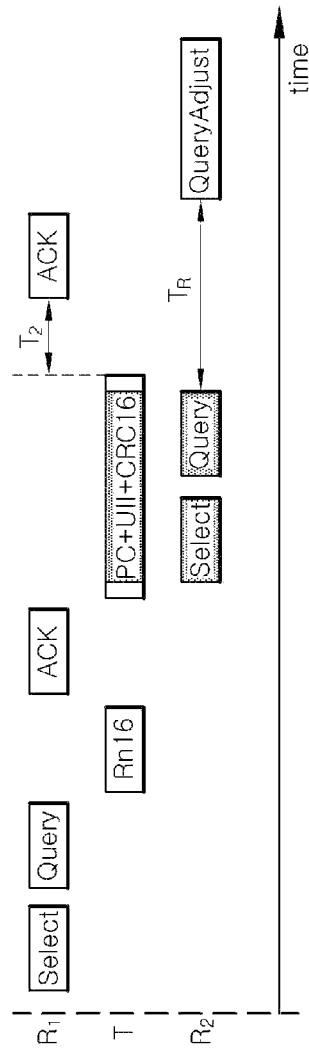

FIGS. 17 to 19 are exemplary timing diagrams for illustrating a collision resolving method depending on each collision situation according to an embodiment of the present invention. A series of exemplifications of an ISO/IEC 18000-6 Type C command and a response sequence including the communication collision and selection of the random wait time are illustrated. The proposed exemplification is any example selected from all possible scenarios. In the case in which the collision occurs between two interrogators $R_1$ and $R_2$ and one tag T, adaptation of the random wait time is exemplified.

In the present invention, in order to alleviate disadvantages at the same time in the mobile RFID environment, the random wait time is introduced and is represented by $T_R$. In order to avoid a problem occurring when two contending RFID interrogators try circulated (re)transmission to interfere with each other, the random wait time is adopted between failed message transmission and retransmission thereof. Although partially described with reference to FIG. 15, only when the preconditions for adopting the random wait time are satisfied, the random wait time is adopted.

Further, when the current collision type cannot be accurately determined or the interrogator does not have the collision diagnosis function, the random wait time may be adopted between two successive inventory commands designated in the process of the tag anti-collision, for example, between Query and QueryAdjust in the case of ISO/IEC 18000-6 Type C in the case in which all the preconditions for adopting the random wait time are satisfied.

First, FIG. 17 illustrates a sequence of adopting a random wait time when a multiple interrogators to tag collision occurs. The interrogator $R_1$ issues a select command and a query command, and receives an Rn16 response from the tag. The interrogator R1 has already singulated one tag and the interrogator R2 does not singulate any tag. In addition, while the interrogator $R_1$ transmits the ACK command, the ACK command collides with the transmitted select command of the interrogator $R_2$. When the collision occurs, the interrogator $R_1$ has already separated the tag T. Therefore, the interrogator $R_1$ immediately retransmits the final command (ACK) in accordance with a timing protocol of ISO/IEC 18000-6 Type C and the interrogator $R_2$ is suspended during the random wait time $T_R$. Herein, $T_3$ represents a wait time after $T_1$ before the interrogator issues other commands.

Referring to the processes of FIG. 15, the interrogator $R_2$ sequentially performs steps S1112, S1122, S1126, S1128, S1130, and S1120 to retransmit the command after suspending the interrogator during the random wait time. As a result, the interrogator $R_1$ can successively receive the tag response consisting of PC+UII+CRC16 and the multiple interrogators to tag collision is resolved.

Next, FIG. 18 illustrates an interrogator to interrogator collision in which two interrogators collide with each other at an initial step of an inventory round. In a state in which two tags are not singulated after the interrogator $R_1$ issues the select command and the query command, the response Rn16 of the tag T and the commands select and query of the interrogator $R_2$ collide with each other, such that the interrogator to interrogator collision occurs.

Therefore, both the interrogator $R_1$ and the interrogator $R_2$ are suspended during the random wait time Tr and thereafter, the interrogator $R_1$ can transmit the QueryAdjust command and the ACK command and successively receive the responses Rn16 and PC+UII+CRC16, and the interrogator to interrogator collision is resolved.

Further, FIG. 19 illustrates a sequence performed in a case in which the interrogator $R_1$ has already separated the tag when the interrogator to interrogator collision occurs. In a state in which the interrogator $R_1$ has already singulated one tag and the interrogator $R_2$ does not singulate any tag, the interrogator to interrogator collision occurs. In this special case, the interrogator $R_1$ retransmits the ACK after $T_2$ and the interrogator R2 is suspended for $T_R$, such that the interrogator to interrogator collision is resolved.

Next, which case the random wait time will be adopted to will be additionally described. In general, the RFID interrogator has three steps of select, inventory, and access. If any tag is not yet acknowledged (although the tag is singulated and the ACK is transmitted, the response is not received) and not inventoried in a current inventory pass, the interrogator is suspended during the random wait time before retransmitting the command during the tag select step or the tag inventory step. Herein, the singulation means a process of separating the tag by forcing the tag into the response slot which is not occupied in order to read the UII of the tag. Meanwhile, the interrogator is not suspended during the tag access step.

The random wait time is not adopted as a default, but is adopted only when the interrogator is at the initial step of the inventory round. That is, the interrogator is adopted only when the tag is not yet separated. Otherwise, both interrogators that collide with each other are automatically suspended after collision and can continuously issue the command substantially in parallel after a short transmission break, cause the collision (subsequent collision) again. Instead, when only one of two interrogators is blocked and suspended during a sufficient time, the other interrogator can retransmit the final command during that time and can terminate all the inventory rounds during that time.

By this method, a possibility that retransmission patterns according to the present invention will overlap each other can be reduced and the older inventory round can be generally terminated earlier than the newer inventory round, such that an equitable wait strategy can be carried out.

Next, according to the embodiment of the present invention, the process in which the random wait time calculation portion 1652 of FIG. 4 calculates the random wait time will be described. The random wait time $T_R$ must be selected to maximize the performance and minimize a possibility of the subsequent collision. Therefore, in order to achieve consistent excellent results, the wait time is randomly selected in a range defined by a minimum retransmission wait time MinWaitTime and a maximum retransmission wait time MaxWaitTime. This wait time is determined as the random wait time.

The random wait time may select a random integer between threshold values specified as Fmin (MinWaitTime) and Fmax (MaxWaitTime) or an integer value corresponding to the number of clock cycles corresponding to a time value between values given by Fmin and Fmax.

Meanwhile, a time in which protocol data units (PDU) may overlap each other represents a contention period (CP). The protocol data unit represents a data block having a predetermined size when data is transmitted and as all types of data packages transmitted by the RFID interrogator or the RFID tag, includes the interrogator command and the tag response. During the contention period, the interrogator command or the tag response is vulnerable and may be broken by interference. In order to reduce vulnerability of a general command sequence issued during the tag inventory or a single protocol data unit, it is preferable to select the random wait time in proportion to the duration of the protocol data unit.

First, the minimum retransmission wait time which is a lower threshold of the random wait time, that is, MinWaitTime (Fmin) is calculated by the following equation.

$$\text{MinWaitTime} = c \text{ duration(longestExpectedPDU)}$$

Herein, c is a constant value (dynamically changeable) that can be set depending on actual application and environment and duration is a function to return required to transmit any protocol data unit on an air interface at a selected link rate. Hereinafter, c is referred to as wait time parameter. The wait time parameter c may be a fixed value or a dynamically changed value. When the wait time parameter c is fixed, a static retransmission wait time can be calculated, for example, c may be 1. 'longestExpectedPDU' as a longest expected protocol data unit is, for example, the PC+UII+CRC 16 tag response shown in FIG. 20.

The lower threshold (minimum retransmission wait time) of the random wait time is determined by the above-mentioned method, such that if two contending interrogators $R_1$ and $R_2$ use the same link rate and have the same lower threshold of the calculated random wait time, it can be assumed that the subsequent collision will not occur by the same protocol data unit in the case in which the interrogator $R_2$ randomly suspends and retransmits the inventory command by the communication collision.

Figure 20:
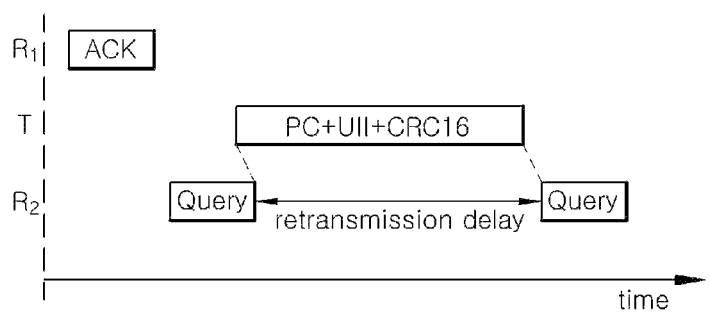
FIG. 20 is a timing diagram for illustrating a meaning of a minimum retransmission wait time according to an embodiment of the present invention.

FIG. 20 is a timing diagram for illustrating a meaning of the minimum retransmission wait time according to an embodiment of the present invention. In FIG. 20, a case in which the longest expected protocol data unit is assumed to be the tag response to the ACK command will be described. Herein, although the interrogator R1 has already singulated the tag T as the current response slot, the interrogator $R_1$ fails to acknowledge the tag due to the interrogator $R_2$ that issues the Query command that collides with the tag response. In general, since the tag does not stop transmission during a collision, the interrogator $R_2$ needs to be suspended while the tag T transmits the response to the ACK that consists of protocol control (PC), UII (Unique Item Identifier), and cyclic redundancy check 16 (CRC16) in order to avoid the subsequent collision. In FIG. 20, a case in which the interrogator R2 is suspended as long as the minimum retransmission wait time and retransmits the command is illustrated. Although other commands issued by the interrogator R1 and subsequent collisions may still occur, it is possible to minimize the problem by setting the maximum retransmission wait time to be still larger than the minimum retransmission wait time.

The longest expected protocol data unit may be different for each interrogator depending on a command (mandatory command and optional command) that the corresponding interrogator supports and the actual application (only inventory or inventory and tag access). At the time of calculating the upper threshold or the lower threshold of the retransmission wait time, it is preferable that the interrogator refers to a longest expected protocol data unit to be transmitted or received in the subsequent inventory round and a longest mandatory command supported by the used air interface specification.

Regarding a protocol data unit transmitted from a return link (tag response), a return link rate at which the interrogator reads during the inventory round by issuing the Query command may be used to determine the longest expected protocol data unit, for example. For example, like backscatter of the UII, although the number of bits to be received is not known in advance, the possible maximum number of bits in the current application can be expected. This means that, for example, although the maximum length of tag backscatter supported by the air interface specification is the larger, values larger than 96 bits are not used to determine the longest expected PDU if the current application supports the length of the UII to 96 bits. Next, the maximum retransmission wait time which is the upper threshold of the random wait time, that is, MaxWaitTime (Fmax) is calculated by the following equation.

$$\text{MaxWaitTime} = c \text{ duration(Select} + T_4 + \text{Query} + T_1 + RN16 + T_2 + \text{ACK} + T_1 + UII)$$

Herein, c is a wait time parameter used to calculate the minimum retransmission wait time, $T_1$ is a time from interrogator transmission to the tag response, and $T_2$ is a time from the tag response to the interrogator transmission. The values follow values determined in the ISO/IEC 18000-6 specification, for example. In the example of the above-mentioned equation, the interrogator transmits the 'Select' command and transmits the query command after the time $T_4$, the tag responds to RN16 after the time $T_1$, and the interrogator transmits the 'ACK' command after the time $T_2$, and the tag responds to UII after the time $T_1$. The UII includes PC, UII, and CRC16 as described above.

A result returned by the function 'duration' that is used in the equation of the maximum retransmission wait time depends on a forward link rate and a return link rate that the interrogator will use in the subsequent inventory round, and an expected length of the tag response to the ACK command. Like the description of the minimum retransmission wait time, the possible maximum number of bits in the current application is expected and used in order to determine the length of UII to be backscattered by the tag. 'Select+$T_4$+Query+$T_1$+RN16+$T_2$+ACK+$T_1$+UII' used in the equation of the maximum retransmission wait time is exemplary and is a value corresponding to 'a total expected time required for the interrogator command and the tag response'. This value may be changed depending on the used air interface specification and application. If the tag access is performed, the relevant additional interrogator command and tag response are used to calculate the maximum retransmission wait time.

FIG. 21 is a timing diagram for illustrating a meaning of the maximum retransmission wait time according to an embodiment of the present invention. In FIG. 21, a case in which expected lengths of the select step and the inventory step are assumed to be determined by 'Select+$T_4$+Query+$T_1$+RN16+$T_2$+ACK+$T_1$+UII' is described. A threshold value determined by the equation of the maximum retransmission wait time can potentially resolve the collision between the interrogator $R_1$ and the interrogator $R_2$.

FIG. 22 is a timing table in an ISO/IEC 18000-6 Type C. An example in which MinWaitTime and MaxWaitTime are calculated depending on the link rate and the command length is described with reference to the timing table. The minimum retransmission wait time and the maximum retransmission wait time are determined depending on the used link rate and the protocol data unit to be transmitted. The table illustrates timings of all relevant protocol data units when the forward link rate is assumed on the basis of Tari=25 μs for data0($0_2$) and a symbol length of 1.5 Tari for data1($1_2$). Further, it is assumed that FM0 encoded data of 40 kbit/s is subjected to return link. These values are exemplary and may be changed depending on the used air interface.

For example, the minimum retransmission wait time MinWaitTime is calculated by c duration (longestExpected PDU)=c duration (UII)=c 3350. If c is 1, the minimum retransmission wait time is 3350 μs. Further, the maximum retransmission wait time MaxWaitTime is calculated by c duration (Select+$T_4$+Query+$T_1$+RN16+$T_2$+ACK+$T_1$+UII)=c (1375.0+125.0+962.5+250.0+550.0+75.0+662.5+250.0+3350.0)=c7600. If c is 1, the maximum retransmission wait time is 7600 μs. In the example, it is assumed that there is no tag access step and when the tag access is performed, the relevant additional interrogator command and tag response can be used to calculate the minimum retransmission wait time and the maximum retransmission wait time.

Next, calculation of an adaptive retransmission wait time will be described. By adaptively changing the wait time parameter c used in the equation of the minimum retransmission wait time and the maximum retransmission wait time described above, requirements in the actual application are best satisfied and in order to achieve a best balance between the performance and the subsequent collision depending on the actual application scenario, the wait time parameter c is used to tune the random wait time by multiplying the wait time parameter c by the upper threshold and the lower threshold of the retransmission wait threshold value. Herein, the retransmission wait threshold value is multiplied by c in the equation of the minimum retransmission wait time and the maximum retransmission wait time. A time required for the longest expected protocol data unit is the lower threshold of the retransmission wait threshold value in the minimum retransmission wait time and the total expected time required for the interrogator command the tag response is the upper threshold of the retransmission wait threshold value in the maximum retransmission wait time.

The wait time parameter c used in the equations of the minimum retransmission wait time and the maximum retransmission wait time may be set to an initial value having a value of 1.0 or more (c>=1.0) at the start of each inventory round and does not decrease until the tag is acknowledged by the interrogator. This is preferable to protect an adjacent interrogator that may have already inventoried and accessed one or more tag of an actual population and reduce a possibility of the collision to occur by the corresponding interrogator.

After the tag is successively detected by the interrogator, the wait time parameter c can be changed during the remaining inventory round period without an additional limitation. That is, the wait time parameter c may increase or decrease at all times depending on determination. If the wait time parameter c is fixed, the static retransmission wait time can be calculated. At this time, at the start of each inventory round, limiting an initial threshold value for the retransmission wait time by limiting the c helps performing an equitable process for use of a channel. The interrogator that is already detecting one or more tag in the tag population has a small wait time in order to terminate the inventory round and a new interrogator activated during that time uses a default set corresponding to an initial value of c and has a low duty cycle.

Figure 23:
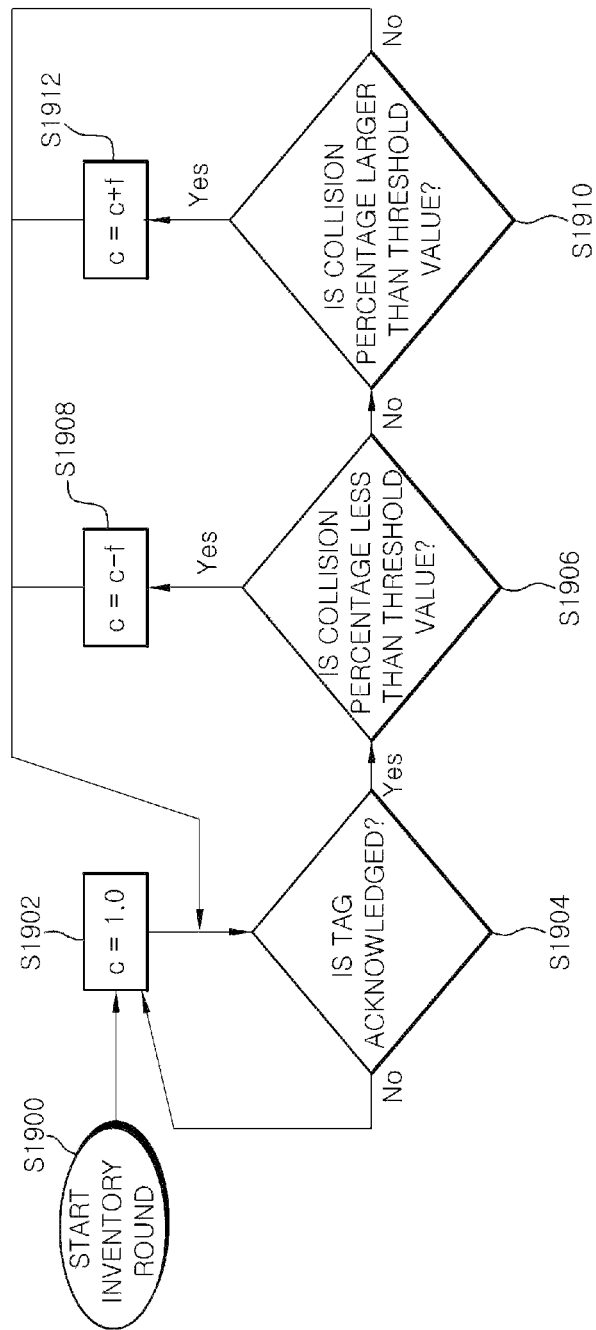
FIG. 23 is a flowchart illustrating a process of dynamically changing a wait time parameter c depending on a current collision percentage.

Since the user can specify the link rate depending on the air interface specification, two contending interrogators may operate at different link rates. In this case, there may be a difference between the minimum retransmission wait time and the maximum retransmission wait time that are calculated by the interrogator $R_1$ and the interrogator $R_2$. Therefore, in the case of a recurrent subsequent collision, it is necessary to adjust the parameter c. On the contrary, when the number of observed collisions is maintained to be continuously small, the same parameter may be used for improving the overall performance. A method of changing the wait time parameter c during the inventory round will hereinafter be described in detail. FIG. 23 is a flowchart illustrating a process of dynamically changing a wait time parameter c depending on a current collision percentage. The wait time parameter c is a parameter used to calculate the minimum retransmission wait time and the maximum retransmission wait time and is multiplied by a retransmission wait threshold. A current collision percentage is an average number of collision times per the interrogator command, for example.

Step S1900 means a start of a new inventory round. When the inventory round is started, the wait time parameter c is set to an initial value at step S1902. In the example, the initial value of c is set to 1.0. The initial value is not changed until at least one tag is acknowledged.

Next, the process proceeds to step S1904 and determines whether or not the tag is acknowledged. As the determination result at step S1904, if the tag is not yet acknowledged, the process returns to step S1902 and the wait time parameter c is maintained to the initial value or reset to the initial value. As the determination result at step S1904, if the tag is not acknowledged, the process proceeds to step S1906. At step S1906, it is determined whether or not the current collision percentage is less than a collision percentage threshold. As the determination result at step S1906, if the current collision percentage is less than the collision percentage threshold, the process proceeds to step S1908 and reduces the wait time parameter c by a parameter variation factor f. That is, after first tag detection (acknowledgement), if the collision percentage is less than a predefined threshold, c is reduced by the factor f for performance improvement.

As the determination result at step S1906, if the current collision percentage is not less than the collision percentage threshold, the process proceeds to step S1910 and determines whether or not the current collision percentage is larger than the collision percentage threshold. If the collision percentage is larger than the predefined threshold, the process proceeds to step S1912 and increases c by the factor f to reduce a subsequent collision probability by extending the average retransmission wait time. There is no exact value given for the parameter variation factor f, because the parameter variation factor f may depend on the actual situation and should be selected to fit to the needs of the application. In general, one could expect the parameter variation factor f to be a value between 0.1 and 1.0 or to not a fixed value but a dynamically changed value.

As the determination result at step S1910, if the collision percentage is not larger than the collision percentage threshold (if the collision percentage is equal to the threshold), the process returns to step S1904 without changing c. The collision percentage threshold mentioned in this example is depending on the actual application scenario. For example, if the number of Mobile RFID users at close proximity is expected to be high (e.g. at a bus station) one will use a higher threshold than for an application where the number of users is expected to be low (e.g. using RFID in your own apartment). In general, the term "collision percentage" denotes the fraction of tag responses that are lost due to interference, i.e., cannot be successively decoded by the interrogator.

Figure 24:
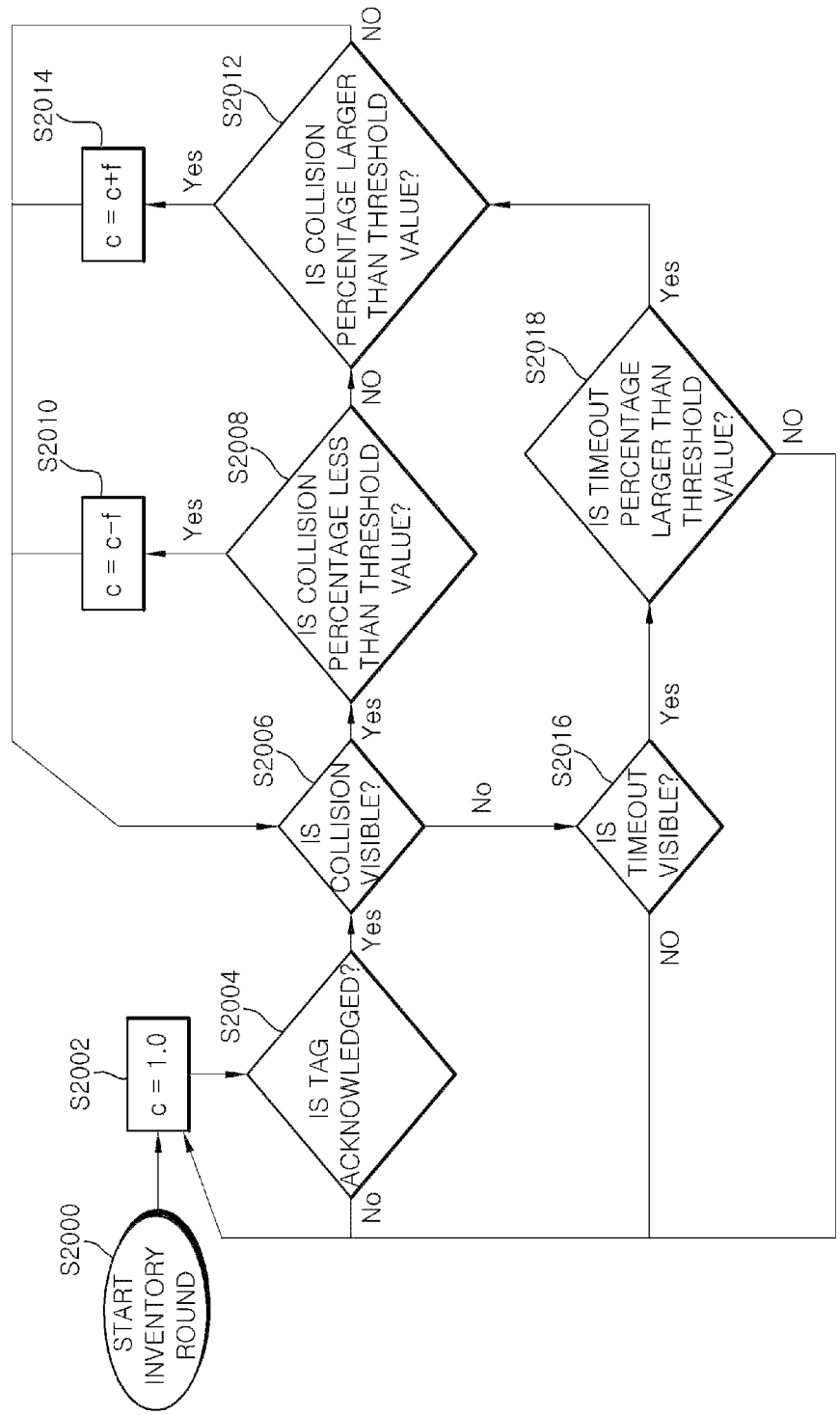
FIG. 24 is a flowchart illustrating a process of dynamically changing a wait time parameter c depending on a current collision percentage and a timeout ratio.

FIG. 24 is extension of the process of FIG. 23 and is a flowchart illustrating a process of dynamically changing a wait time parameter c depending on a current collision percentage and a timeout ratio. In the embodiment, the receiver timeout percentage (ratio of unanswered interrogator commands) can be used in combination with a predefined timeout threshold. The wait time parameter c is dynamically increased or reset in the case of recurrent receiver timeouts depending on the current collision situation.

All conditions shown in FIG. 24 are referring to the interrogator side. For instance, "Collision visible" at step S2006 means that a collision is detectable for the interrogator by evaluating a received bit stream. This does not include the multiple interrogators to tag Collision that are only revealed on the tag side. Additionally, it has to be considered that an emerging receiver timeout on the interrogator side is not always due to the absence of a matching tag in the current response slot, but may also indicate a hidden multiple interrogators to tag Collision. Therefore, in the embodiment, a condition "Timeout percentage above threshold?" at step S2018 and a condition "Collision percentage above threshold?" at step S2012 are organically combined with each other.

The term "timeout percentage" refers to the ratio of unanswered interrogator commands. For instance, if an interrogator transmits 4 commands, but receives a response (valid or invalid) only on 2 of them, this results in a timeout percentage of 0.5. Commands that do not require any tag response such as Select are not used to calculate the timeout percentage. The exact value of the timeout percentage threshold is depending on the actual application and may differ from one scenario to another.

In the embodiment, this approach ensures that retransmissions due to receiver timeouts do not additionally deteriorate the collision situation if collisions are already at their peak when a receiver timeout is observed. Moreover, parameter c is reset to its initial value again in favor of protocol performance if the current timeout ratio drops below the timeout threshold. The term "collision" used in the embodiment means all types of collisions. No differentiation between the different possible types of collisions according to the present invention is assumed.

In FIG. 24, step S2000 means a start of a new inventory round. When the inventory round is started, the wait time parameter c is set to the initial value at step S2002. In the example, the initial value of c is set to 1.0. The initial value is not changed until at least one tag is acknowledged.

Next, the process proceeds to step S2004 and determines whether or not the tag is acknowledged. As the determination result at step S2004, if the tag is not yet acknowledged, the process returns to step S2002 and the wait time parameter c is maintained to the initial value. As the determination result at step S2004, if the tag is acknowledged, the process proceeds to step S2006. At step S2006, it is determined whether or not the collision is visible. That is, it is determined whether or not the collision is detectable for the interrogator by evaluating the received bit stream. If it is determined that the collision is visible, the process proceeds to step S2008 and determined whether or not the current collision percentage is less than the collision percentage threshold. As the determination result at step S2006, if the current collision percentage is less than the collision percentage threshold, the process proceeds to step S2010 and reduces the wait time parameter c by the parameter variation factor f.

As the determination result at step S2008, if the current collision percentage is not less than the collision percentage threshold, the process proceeds to step S2012 and determines whether or not the current collision percentage is larger than the collision percentage threshold. If the collision percentage is larger than the predefined threshold, the process proceeds to step S2014 and increases c by the factor f to reduce a subsequent collision probability by extending the average retransmission wait time. As the determination result at step S2012, if the collision percentage is not larger than the collision percentage threshold (if the collision percentage is equal to the threshold), the process returns to step S2006 without changing c.

Meanwhile, as the determination result at step S2006, if it is determined that the collision is invisible, the process proceeds to step S2016 and determines whether or not the timeout is visible. If the timeout is invisible, the process proceeds to step S2002 resets c to the initial value, but if the timeout is visible, the process proceeds to step S2018 and determines whether or not the timeout percentage is larger than the predefined timeout percentage threshold. If it is determined that the timeout percentage is equal to or less than the threshold at step S2018, the process returns to step S2002, but if it is determined that the timeout percentage is larger than the threshold, the process proceeds to step S2012 and compares the collision percentage and the threshold. It is possible to adaptively change and set a retransmission wait time by repetitively performing the process every inventory round. The above-mentioned air interface specification regarding the mobile RFID interrogator of the present invention may be adopted in combination with the known air interface specification developed to be used for the static RFID interrogator. In the present invention, the configuration and method of the embodiments described as above can be limitatively adopted, but the embodiments may be configured by selectively combining all the embodiments or some of the embodiments so that various modifications can be made.

INDUSTRIAL APPLICABILITY

The present invention is used for a mobile RFID system to largely contribute to base expansion of a mobile RFID by reducing a possibility of a collision, and grasping a cause for occurrence of the collision and adaptively resolving the collision depending on the cause and situation when the collision occurs.

The invention claimed is:
1. An RFID interrogator calculating an adaptive retransmission wait time, comprising:
a collision diagnosis unit that analyzes data on a received signal, verifies whether a collision occurs in the received signal, and in response to a determination that a collision has occurred, diagnoses a collision type depending on an analysis result of the data on the received signal;

a situational command retransmission portion that determines whether a command will be retransmitted on the basis of the collision type; and in response to the determination that the command will be retransmitted, a random wait time calculation portion calculates a random wait time for retransmitting the command, wherein the random wait time calculation portion randomly selects the random wait time between a minimum retransmission wait time and a maximum retransmission wait time; and the minimum retransmission wait time is calculated by multiplying a wait time parameter by a lower threshold of a retransmission wait threshold value, and the maximum retransmission wait time is calculated by multiplying the wait time parameter by a higher threshold of the retransmission wait threshold value, and the wait time parameter is dynamically changed.

2. The RFID interrogator according to claim 1, wherein the lower threshold of the retransmission wait threshold value is a time required for a longest expected protocol data unit (PDU) to be transmitted.

3. The RFID interrogator according to claim 2, wherein the longest expected protocol data unit is a protocol data unit that comprises PC, UII, and CRC16.

4. The RFID interrogator according to claim 1, wherein the upper threshold of the retransmission wait threshold value is determined by a time required for transmitting 'Select' command, transmitting a query command, receiving an RN16 response, transmitting an ACK command, and receiving an UII response.

5. The RFID interrogator according to claim 4, wherein the upper threshold of the retransmission wait threshold value is determined by $T_4$ which is a time between the 'Select' command transmission and the query command transmission, $T_1$ which is a time to a tag response from a reader transmission and $T_2$ which is a time to the reader transmission from the tag response.

6. The RFID interrogator according to claim 1, wherein the random wait time calculation portion sets the wait time parameter to a predefined initial value when the inventory round is started.

7. The RFID interrogator according to claim 1, wherein the random wait time calculation portion does not decrease the wait time parameter until the tag is acknowledged.

8. The RFID interrogator according to claim 1, wherein the random wait time calculation portion dynamically changes the wait time parameter during an inventory round.

9. The RFID interrogator according to claim 1, wherein the random wait time calculation portion decreases the wait time parameter by a parameter variation factor when determining that a current collision percentage is less than a collision percentage threshold.

10. The RFID interrogator according to claim 1, wherein the random wait time calculation portion increases the wait time parameter by a parameter variation factor when determining that a current collision percentage is larger than a collision percentage threshold.

11. The RFID interrogator according to claim 1, wherein the random wait time calculation portion increases the wait time parameter by a parameter variation factor when determining that a timeout percentage is larger than a timeout threshold and a collision percentage is larger than a collision percentage threshold.

12. The RFID interrogator according to claim 1, wherein the random wait time calculation portion resets the wait time parameter to an initial value when determining that a timeout percentage is equal to or less than a timeout threshold.

13. A control method of an RFID interrogator calculating an adaptive retransmission wait time, comprising:

a collision diagnosis step of allowing a collision diagnosis unit to analyze data on a received signal, verify whether a collision occurs in the received signal, and in response to a determination that a collision has occurred, diagnose a collision type depending on an analysis result of the data on the received signal;

a command retransmission determination step of allowing a situational command retransmission portion to determine whether to retransmit a the command on the basis of the collision type;

in response to the determination that the command will be retransmitted, a random wait time calculating step of allowing a random wait time calculation portion to calculate a random wait time for retransmitting a command, wherein at the step of calculating the random wait time, the random wait time is randomly selected between a minimum retransmission wait time and a maximum retransmission wait time; and the minimum retransmission wait time is calculated by multiplying a wait time parameter a lower threshold of a retransmission wait threshold value, and the maximum retransmission wait time is calculated by multiplying the wait time parameter by a higher threshold of the retransmission wait threshold value, and the wait time parameter is dynamically changed.

14. The control method of an RFID interrogator according to claim 13, wherein the lower threshold of the retransmission wait time threshold value is a time required for a longest expected protocol data unit (PDU) to be transmitted.

15. The control method of an RFID interrogator according to claim 13, wherein the longest expected protocol data unit consists of PC, UII, and CRC.

16. The control method of an RFID interrogator according to claim 13, wherein at the random wait time calculation step, the wait time parameter is set to a predefined initial value when the inventory round is started.

17. The control method of an RFID interrogator according to claim 13, wherein at the random wait time calculation step, the wait time parameter is not increased until the tag is acknowledged.

18. The control method of an RFID interrogator according to claim 13, wherein at the random wait time calculation step, the wait time parameter is decreased by a parameter variation factor when it is determined that a current collision percentage is less than a collision percentage threshold.

19. The control method of an RFID interrogator according to claim 13, wherein at the random wait time calculation step, the wait time parameter is increased by a parameter variation factor when it is determined that a current collision percentage is larger than a collision percentage threshold.

20. The control method of an RFID interrogator according to claim 13, wherein at the random wait time calculation step, the wait time parameter is increased by a parameter variation factor when it is determined that a timeout percentage is larger than a timeout threshold and a collision percentage is larger than a collision percentage threshold.

* * * * *